(12) United States Patent
Gourisetti et al.

(10) Patent No.: US 11,727,120 B2
(45) Date of Patent: Aug. 15, 2023

(54) BLOCKCHAIN CYBERSECURITY SOLUTIONS

(71) Applicant: Battelle Memorial Institute, Richland, WA (US)

(72) Inventors: Sri Nikhil Gupta Gourisetti, Richland, WA (US); Michael E. Mylrea, Alexandria, VA (US); Craig H. Allwardt, Kennewick, WA (US); Beverly E. Johnson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 352 days.

(21) Appl. No.: 16/926,605

(22) Filed: Jul. 10, 2020

(65) Prior Publication Data

US 2021/0014065 A1 Jan. 14, 2021

Related U.S. Application Data

(60) Provisional application No. 62/957,111, filed on Jan. 3, 2020, provisional application No. 62/872,986, filed on Jul. 11, 2019.

(51) Int. Cl.
| | |
|---|---|
| *G06F 21/57* | (2013.01) |
| *H04L 9/06* | (2006.01) |
| *G06F 16/27* | (2019.01) |
| *H04L 9/32* | (2006.01) |
| *H04L 9/00* | (2022.01) |

(Continued)

(52) U.S. Cl.
CPC ............ *G06F 21/577* (2013.01); *G06F 16/27* (2019.01); *G06Q 10/06375* (2013.01);
(Continued)

(58) Field of Classification Search
CPC ........ G06F 21/577; G06F 16/27; G06F 21/64; G06Q 10/06375; G06Q 30/018;
(Continued)

(56) References Cited

U.S. PATENT DOCUMENTS

| | | |
|---|---|---|
| 2017/0103468 A1 | 4/2017 | Orsini et al. |
| 2018/0117447 A1 | 5/2018 | Tran |

(Continued)

FOREIGN PATENT DOCUMENTS

| | | | |
|---|---|---|---|
| CN | 111369088 A | * | 7/2020 |
| CN | 110032891 B | * | 6/2021 |

(Continued)

OTHER PUBLICATIONS

International Search Report and Written Opinion, International Application No. PCT/US2020/067715, 11 pages, dated Apr. 26, 2021.

(Continued)

*Primary Examiner* — Mohammed Waliullah
(74) *Attorney, Agent, or Firm* — Klarquist Sparkman, LLP

(57) ABSTRACT

Technology related to blockchain cybersecurity solutions and a blockchain applicability framework is disclosed. In one example of the disclosed technology, a system is configured to store, in a database, a plurality of cryptographically-signed records of data transmitted between an asset and a utility historian, and store, in a distributed ledger, a respective hash value corresponding to each record of the database. The system can be further configured to verify a selected record by recomputing a hash value corresponding to the selected record and comparing the recomputed hash value to the respective hash value stored in the distributed ledger in correspondence with the selected record.

18 Claims, 11 Drawing Sheets

(51) Int. Cl.
  *G06Q 10/0637* (2023.01)
  *G06Q 30/018* (2023.01)
  *G06Q 50/06* (2012.01)
(52) U.S. Cl.
  CPC .......... *H04L 9/0637* (2013.01); *H04L 9/3236* (2013.01); *G06Q 30/018* (2013.01); *G06Q 50/06* (2013.01); *H04L 9/50* (2022.05)
(58) Field of Classification Search
  CPC ..... G06Q 50/06; H04L 9/0637; H04L 9/3236; H04L 9/50; H04L 63/12; H04L 9/3239; Y04S 40/20
  See application file for complete search history.

(56) References Cited

U.S. PATENT DOCUMENTS

| | | | |
|---|---|---|---|
| 2019/0295193 A1 | 9/2019 | Winand et al. | |
| 2020/0210410 A1* | 7/2020 | Li | G06F 16/22 |

FOREIGN PATENT DOCUMENTS

| | | | |
|---|---|---|---|
| WO | WO-2017026987 A1 * | 2/2017 | G06F 11/14 |
| WO | WO 2019/226765 | 11/2019 | |

OTHER PUBLICATIONS

Mylrea et al., "Blockchain for Supply Chain Cybersecurity, Optimization and Compliance", 2018 Resilience Week (RWS), pp. 70-76, Aug. 23, 2018 (retrieved on Apr. 6, 2021).

* cited by examiner

BLOCKCHAIN CYBERSECURITY SOLUTIONS

CROSS-REFERENCE TO RELATED APPLICATIONS

This application claims the benefit of U.S. Provisional Patent Application No. 62/872,986, entitled "BLOCKCHAIN-BASED CYBERSECURITY SOLUTION (BCS) TO SECURE DATA-AT-REST, DATA-IN-TRANSIT, AND AUTONOMOUS REGISTRATION, VERIFICATION AND TRACTABILITY OF SYSTEMS," filed Jul. 11, 2019; and U.S. Provisional Patent Application No. 62/957,111, entitled "EVALUATION AND DEMONSTRATION OF BLOCKCHAIN APPLICABILITY FRAMEWORK," filed Jan. 3, 2020, all of which are incorporated by reference herein in their entireties.

ACKNOWLEDGMENT OF GOVERNMENT SUPPORT

This invention was made with government support under DE-AC0576RL01830 awarded by the U.S. Department of Energy. The government has certain rights in the invention.

BACKGROUND

The energy industry and electrical grid are important components of modern life, and are under increasing threat of cyberattacks. Such threats may target both the software and hardware installed in the electrical grid, as well as the supply chain for the energy industry. However, with the large number of entities involved in the industry and the supply chain, enacting effective security can be difficult. Further, security can often be considered second to other considerations in the industry, such as functionality or cost. Regulations attempt to address this issue, but compliance assessments, audits, and risk management are often manual, making them prohibitively expensive, time-consuming, and inaccurate, especially across an entire software and hardware supply chain. Such difficult-to-measure regulatory compliance can lead to a false sense of security, reduced revenues, and resource challenges. Accordingly, there is great room for improvement.

SUMMARY

Systems and methods for providing a Blockchain Applicability Framework (BAF) and Blockchain-Based Cybersecurity Solutions (BCS) are disclosed. In one example of the disclosed technology, a system, such as a cyber controller, is configured to perform distributed ledger operations. The distributed ledger operations may include storing, in a database, a plurality of records of data transmitted between an energy delivery system asset and a utility historian for an energy delivery system, the plurality of records being cryptographically-signed, and storing, in a distributed ledger, a respective hash value corresponding to each record of the plurality of records stored in the database. The distributed ledger operations may further include verifying a selected record stored in the database by recomputing a hash value corresponding to the selected record to generate a recomputed hash value for the selected record and comparing the recomputed hash value to the respective hash value stored in the distributed ledger in correspondence with the selected record, and configuring at least one aspect of the energy delivery system based on the verification of the selected record.

In another example of the disclosed technology, a computer-implemented method includes storing, in a distributed ledger, a respective hash value representing each of a plurality of cryptographically-signed data records, the plurality of cryptographically-signed data records including a record of data transmitted between an energy delivery system asset and a utility historian for the energy delivery system or between the energy delivery system asset and another hardware system. The method further includes verifying the record of data by recomputing a hash value for the record of data to generate a recomputed hash value and comparing the recomputed hash value to the respective hash value representing the record of data as stored in the distributed ledger, and selectively configuring at least one aspect of the energy delivery system using the record of data based on a result of the verification of the record of data.

In another example of the disclosed technology, a computer-readable storage media stores instructions that cause a computer to receive parameters for a blockchain candidate application, evaluate a first subset of the parameters for a first level of applicability of blockchain usage, evaluate a second subset of the parameters for a second level of applicability of one or more blockchain privacy types, and evaluate a third subset of the parameters for a third level applicability of one or more blockchain types. The instructions may further cause the computer to calculate an overall percentage distribution of each of the first, second, and third levels of applicability, and output an indication of the calculated overall percentage distributions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

DETAILED DESCRIPTION

Figure 1:
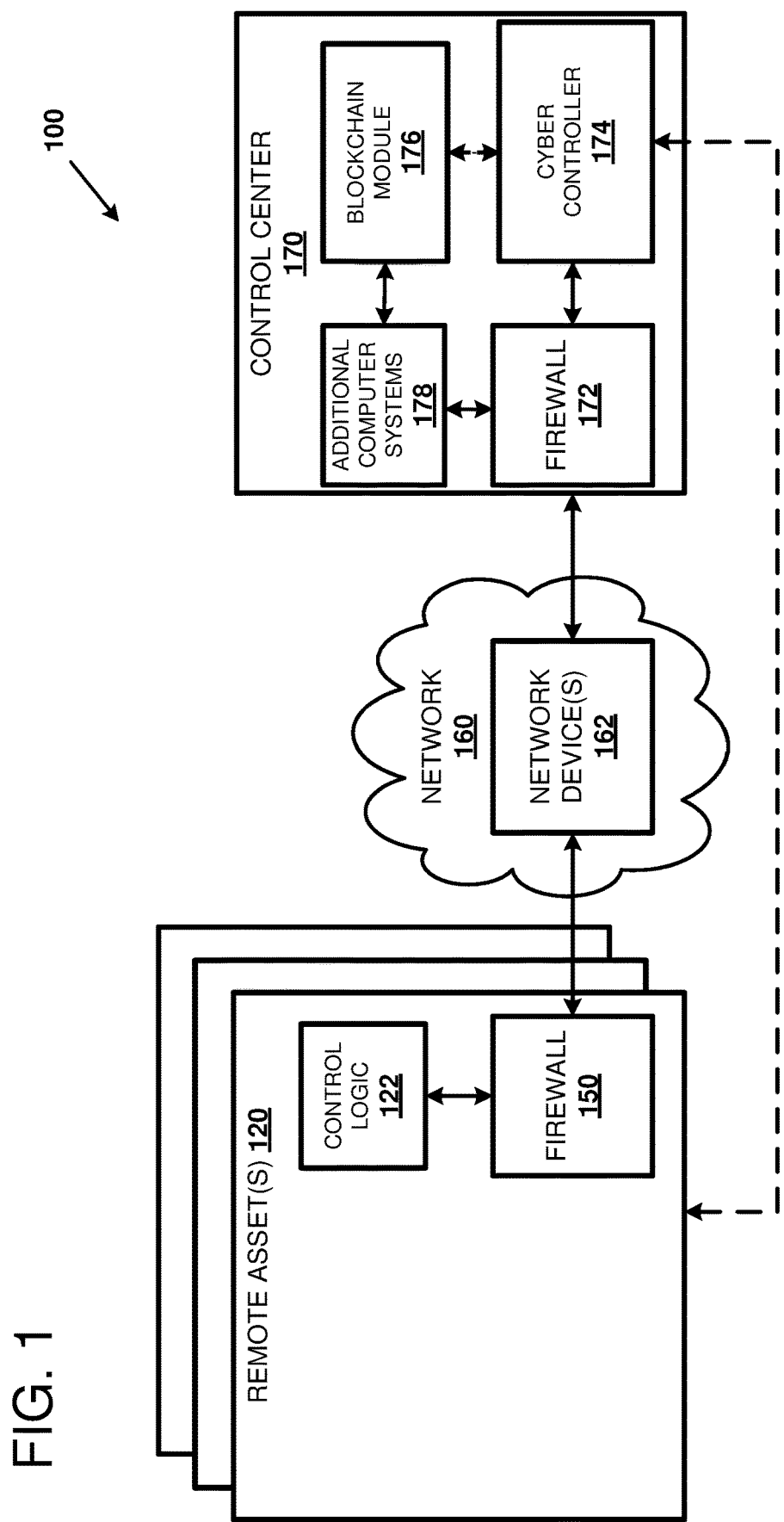
FIG. 1 is a system diagram of an example of cyber-physical system including a cyber controller and a risk module.

This disclosure is set forth in the context of representative examples that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel features and aspects of the various disclosed examples, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed examples can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed examples, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or application-specific processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood to one of ordinary skill in the relevant art having the benefit of the present disclosure that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based examples (comprising, for example, computer-readable instructions that when executed, cause a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Overview

The power grid is becoming increasingly interconnected, as information from grid operations is configured to be accessible to an array of engineers, grid regulators, and market operators. However, there remain challenges ensuring the appropriate integrity and authenticity of the grid data. While traditional cryptographic protocols, like public key infrastructure, provide security for in-transit communication, they come with key exchanges and cost to get public key certificates from a centralized authority. In addition, existing power grid infrastructure lacks efficient security systems that can protect data-at-rest, data in-transit, and facilitate a means to register and verify the authenticity of the assets in real-time.

Most connected infrastructure can be classified under two categories: Information Technology (IT) and Operations Technology (OT). In a typical hardware-centric organization such as power utilities, both the IT and OT networks are equally important. Typically, the IT network consists of email servers, organizational database, web server, human resources, etc. The OT network consists of the industrial control systems (ICS)—often referred to as energy delivery systems (EDS). ICS include remote terminal units (RTU), programmable logic controllers (PLC), field devices and sensors, etc. These networks are designed with firewalls between them to enable clear segregation and a network administrator can navigate between the IT and OT network. If a cyber-attack leads to loss of administrative credentials, the attacker can bring down the entire system and potentially result in loss of life, loss of power, infrastructure damage, etc. Individual components of IT and OT networks can be monitored and controlled using cybercontrollers, as discussed in further detail below.

In the current state, the systems in the IT and OT networks are not designed to ensure integrity between each other. That means, these devices are not designed to be intelligent enough to verify and validate each other's state and verify the data that has been transmitted across these connected systems. Moreover, there are several fundamental cybersecurity challenges ranging from policy adaptation/implementation challenges to system architecture challenges.

Examples of the disclosed technology include blockchain-based cybersecurity implementations to address such challenges. The disclosure provides example blockchain-based cybersecurity solutions (BCS), which will be described in more detail below. Before implementing such a solution, however, a blockchain applicability framework (BAF) may be used to evaluate various factors surrounding blockchain. For example, the disclosed technology includes the structure and overarching design process of the framework—BAF may walk a user (or an interested party) through multiple controls (e.g., hundreds of controls) to determine various factors, including: whether the application is suited to blockchain; if the application is suited to blockchain, should it use private blockchain or permissionless/public blockchain. The disclosed technology can be used to determine which consensus types are suitable, or most suitable, for the application. In some examples, the BAF may evaluate between four consensus mechanisms: proof-of-work, proof-of-stake, proof-of-burn, and proof-of-authority.

Based on the market and literature analysis, it is evident that the majority of the blockchain applicability models designed so far focus mostly on data related parameters, reader and writer requirements, and network parameters with some emphasis on trust parameters. There was found to be little to no emphasis on parameters related to authority node requirements, smart contract parameters, consensus processes and requirements, access controls, and market design. In one example model, consideration is provided for one high-level factor related to market design. The user is required to answer if there is going to be any market approach. However, this example model does not evaluate user requirements related to the core aspects of market design, such as price volatility, incentivization, and costs vs. benefits analysis. Other models focus on system-level requirements, and only some of them focused on user-level requirements. The evaluated models were also fairly distributed in focusing on need and type analysis, with almost no emphasis on consensus analysis.

The disclosed technologies of BAF not only consider high-level user requirements, but also consider core technical aspects and parameters that are strongly related to system-level analysis. BAF performs a need analysis, a type analysis, and a consensus analysis. Such a collection of analyses is not found in other models. In the evaluation process itself, BAF may not make a binary decision based on response to a control. Instead, BAF evaluates the responses to all the controls and present the analysis to indicate the most likely or least likely. The other models perform a binary analysis with a Yes or No end result. Since blockchain technology has several aspects, including immutable distributed ledger, smart contracts, cryptocurrency designability, multi-channel architectures with customizable access controls and visibility restrictions (similar to Hyperledger Fabric), auditability features, and other features, binary decision-making based on the response to a control could potentially lead to an oversimplification of the technology and its scope. Therefore, BAF determines a likely recommendation through percentage distribution (suitability for blockchain, type, and consensus) based on the weighted analysis across all controls. Because of the increased complexity and possible bias that may be introduced as the number of controls increase, BAF follows a relative-weighted approach where a particular state of a control is associated with a relative weight value of 1 or 2.

As described above, the disclosed technologies provide example Blockchain-Based Cybersecurity Solutions, which may be used, for example, if the BAF described above determines a likely recommendation for use of blockchain for a given application. In other examples, the described BCS may be used even if the application is not evaluated using BAF. In some examples, blockchain-based cybersecurity implementations (BCI) provide trustworthiness and integrity of data for energy delivery system (EDS) devices within the electricity infrastructure. In some examples, a BCI is directed to an Energy Management System (EMS) and Distribution Management System (DMS). In some examples, the BCI provides integrity violation and tamper detection capabilities of the data for application, configuration, and endpoint telemetry services through the combined cyber security integrity features of blockchain technology and an agent execution platform. An example of a suitable agent execution platform for use with disclosed techniques is VOLTTRON™ platform distributed by Pacific Northwest National Laboratory (PNNL) to provide services to agents to allow them to easily communicate with physical devices and other resources. As will be readily understood to one of ordinary skill in the art having the benefit of the present disclosure, other agent execution platforms, including those provided by other entities, may also be adapted to the disclosed technology.

In some examples of the disclosed technology, a BCI maintains the integrity of data-at-rest and/or data-in-transit. In addition, through certain examples of BCI, an end-user can register their industrial control systems or energy delivery systems for real-time monitoring, automated asset management, and situational awareness. Since the operational technology (OT) systems may communicate using various protocols, an agent execution platform can be used to develop respective protocol agents. Such agents may interface between the OT systems, blockchain network, and the execution platform message bus. BCI can be used to advance the trustworthiness and integrity of the SCADA data being stored and exchanged in a way that helps prevent spoofing, corrupting and destruction of these data sets. In some examples, this is achieved by creating a copy of existing data envelope from a historian (e.g., a log that captures both the past and the present) and the data that is exchanged between hardware systems (in real-time). As used herein, a data envelope refers to a cryptographically signed data structure or dictionary that is represented by a unique hash value. The data envelopes can be stored in a standalone database, such as an agent execution platform database. The hash of the data envelopes can be stored in the blockchain's immutable distributed ledger and at any given time, the validity of a data envelope can be verified by recomputing the hash and comparing with the hash on the blockchain. If the hash values match, that implies that the data envelope is not manipulated since the date of creation.

In such an instance of matching hash values, a system associated with the asset corresponding to the data envelope may be configured based on the verification and/or the content of the data envelope. If the hash values fail to match, it indicates that the data envelope and/or the data value in the data envelope is manipulated or corrupted. In such an instance of non-matching hash values, an indication of the non-matching hash values may be output to alert a user of the system (e.g., a user responsible for security of the system) and/or an indicator of the non-matching hash values may be stored in a log for later retrieval. In such instances, the system may not be configured in accordance with the unverified data envelope in order to prevent unauthorized tampering with the system. Examples of BCI systems are capable of securing field measurements, device states, data that has been in transit/exchanged between the systems, and syslogs/alerts. Using certain exemplary BCI systems, even if the utility in-house historian is compromised, the immutable BCI historian may be available to retrieve the lost data (while verifying the authenticity through hash-check with the blockchain). It should be noted that from the instant a BCI system is adopted into a utility network, the data from initialization to the final date of decommission of the BCI system, the data envelope creation process can be performed in an autonomous fashion. The BCI system can also take the existing data in the historian (the past) and create the data envelopes using that data.

Examples of cybersecurity attributes that can be realized with certain disclosed BCI systems can include one or more of the following:

1. By creating a historian of data envelopes that can only be accessed or changed by being compliant with the rulesets defined by BCI, if the historian logs were lost through whatever event, the historian data can be accessed through the BCI historian. Note that having administrative access may not be sufficient to access (read or write) the BCI historian.

2. System registration and system-to-system verification in the blockchain that could potentially regulate attack propagation. Beyond the data integrity use-cases, BCI systems can be used to capture device static information in the blockchain. BCI systems can be used to define rules to identify device-to-device communication restrictions. As an illustrative example, if device A sends a message to device B, device B may verify the authenticity of device A before accepting the data packet from device A. Such features may not completely eliminate an attack but can at least regulate the attack from propagating any further.

In some examples, a BCI provides enhanced data authentication, provenance and auditability of EDS and OT, such as control center and asset systems, to ensure that the data and commands that are being exchanged between the utility systems are both secure and auditable and trustworthy. In addition to the data integrity, the BCI can also ensure nonrepudiation and accountability of a system's role in transmitting the data and measurements. In some examples, BCI systems and OT systems may communicate using various suitable protocols (TCP/IP, DNP3, Modbus, BacNet, etc.). The VOLTTRON platform or a similar agent-based system can be used to develop respective protocol agents. Such agents can interface between the OT systems, blockchain network, and the message bus to provide a more secure environment for critical OT, IT and IoT devices, systems, networks and communications.

Some of the security aspects that can be realized in certain example BCI systems include bat are not limited to: on-chain data-at-rest security, off-chain data-at-rest security, on-chain data-in-transit security, and on-chain data-in-transit security.

Certain examples of on-chain data-at-rest security can use parallel and/or in-line connections. Parallel connections can passively connect the BCI system as an in-parallel entity to the utility historian. The BCI system captures all the past records of the historian to create an immutable backup system where the records are cryptographically signed. Since the time of deployment, the BCI system passively listens to the historian system to capture all the data records that are sent to the historian by the utility systems. Then, the BCI system may stage the cryptographically signed records into an immutable ledger. Note that this approach relies on on-chain only processes. Therefore, the data and the associated hashes are on the chain. This process is blockchain agnostic and mostly compatible with some of the older class of blockchain with no off-chain capabilities.

For in-line connections, the BCI system connects in-line with the historian system where the data records flow through the BCI system infrastructure. For example, a database and/or distributed ledger of the BCI system may be positioned between an asset and the historian system along a communication path, such that the data records flow through and/or are captured by the BCI system infrastructure before reaching the historian. Therefore, prior to staging the data record in the historian, a signed copy of the record is transferred to the immutable ledger.

Certain examples of off-chain data-at-rest security use parallel and/or in-line connections. For parallel connections, example BCI systems can be adapted to OT, ICS and EDS and adaptable with various blockchains with on-chain and off-chain capabilities. The base functoriality of The BCI system may be similar to on-chain, but with certain modifications. In this architecture, the BCI system will be connected to an off-chain database system. In this case, the data record copies are cryptographically signed, and the signed records are staged in the off-chain database. The hash value of the respective data records is stored on the blockchain's immutable ledger. A smart contract application or an off-chain application can be used to perform periodic time-synchronized verification of the data records. Such verification can be performed by recomputing the hash and verifying its value with the hash value on the blockchain. If the hash values match, that implies that the record in the off-chain database is not manipulated since the date of creation. If the hash values fail to match, it indicates that the record in the off-chain database is manipulated or corrupted.

For off-chain, in-line connections, functionality is similar to on chain, but in this configuration an off-chain database can be used.

In on-chain data-in-transit security examples, parallel or in-line connections can be used. The BCI system can secure field measurements, device states, data that has been in transit/exchanged between the systems, and syslogs/alerts. Parallel connections can be used to passively connect the BCI system as an in-parallel entity to the utility systems that have a valid communication channel with an intent to periodically communicate. The BCI system can be staged as a parallel system that listens at the data records that are sent (from transmitting end) and received (from receiving end). The BCI system can capture a copy of the record and stages in the immutable distributed ledger where the records are cryptographically signed. Since the time of deployment, the BCI system can passively listen to the systems to capture all the data records until disabled. Then, the BCI system can stage the cryptographically signed records into an immutable ledger. It should be noted that this approach uses on-chain only processes. Therefore, the data and the associated hashes are on the chain. This process is blockchain agnostic and mostly compatible with some of the older class of blockchain with no off-chain capabilities. In some examples, a smart contract can be used to periodically compare the records at the transmitting end and receiving end in a time-synchronized fashion to detect possible man-in-the-middle attacks and other data spoofing attacks. For examples of on-chain data-in-transit using in-line connections, a BCI system is connected in-line with the utility systems where the data records flow through the BCI system infrastructure. Therefore, prior to completing transmission of a record (a command or a measurement), the BCI system in-line system first captures the record and a signed copy of the record is transferred to the immutable ledger. Then, a command/measurement is issued to the receiving end.

For certain examples that employ off-chain data-in-transit security a BCI system can be used for securing field measurements, device states, data that has been in transit/exchanged between the systems, and system logs/alerts using parallel and/or in-line connections. Even if the utility in-house historian is compromised, the immutable historian may be available to retrieve the lost data (while verifying the authenticity through hash-check with the blockchain). Note that from the instant The BCI system solution is adopted into a utility network, the data from initialization to the final date of decommission of the system, the cryptographic signing and staging of data records can be performed in an autonomous fashion. Other related key cybersecurity aspects of disclosed BCI systems are described below:

a. The above defined processes may pertain to the rulesets defined in the (off-chain or on-chain) smart contracts that are part of the BCI system. Therefore, for example, if the historian logs were lost through whatever event, the historian data can be accessed through the BCI system Note that having administrative access may not be sufficient to access (read or write) the historian.

b. System registration and system-to-system verification in the blockchain that could potentially regulate attack propagation. Beyond the data integrity use-cases, the BCI system solution can be used to capture device static information in the blockchain. The BCI system can be used to define rules to identify device-to-device communication restrictions. For example, if device A sends a message to device B, device B may verify the authenticity of device A before accepting the data packet from device A. Such features may not completely eliminate an attack but can at least regulate the attack from propagating any further.

Certain examples of BCI systems enforce resilient means of communication between the OT systems. Certain BCI systems achieve this through an ability to integrate with off-chain applications and smart contracts and interfacing protocol agents where those interfacing systems can verify the integrity of the command and the state of the transmitting system before the device accepts it.

Certain BCI system can include one or more aspect of blockchain technology, including but not limited to: cryptographic hashing of records, ability to sign the records, form consensus for the transactions, etc. Therefore, by integrating a BCI system with OT systems, there is a potential to improve the reliability of services. For example, BCI systems can be used as an in-line solution to ensure the data from the validated transmitting entity is successfully sent to the intended and validated receiving entity.

Certain BCI system are blockchain agnostic and protocol agnostic. Therefore, the system can be designed and integrated with any of the existing blockchain technologies. In addition, such BCI system may work with any OT protocols given there are protocol translating agents that represent the devices (unless the devices can directly participate as the nodes).

Certain BCI systems can enable the user to define rulesets ensure the confidentiality of the OT systems. In addition, the ability of a BCI system to represent an asset through a universally unique identifier (UUID) ensures the confidentiality of the OT assets. The immutability nature and the encryption methods used in disclosed systems can be used to ensure the integrity of the data. In certain examples, ruleset and smart contract features can ensure access controls, so that data is available to the permissioned nodes in real-time. Since BCI systems can capture the data at each connected OT system, off-chain/on-chain applications and smart contracts can be used to ensure non-repudiation of the devices that send the commands and measurements. Certain BCI systems can be used to ensure non-repudiation ensures to hold the OT systems accountable for any actions. Examples of cyber attacks that can be mitigated by certain exemplary BCI systems include man-in-the-middle attack, data injection and spoofing, etc. The immutable record features also ensure accountability among some of the other above features such as integrity.

Example Architectures of Cyber Controllers for a BCI

FIG. 1 is a system diagram of an example of cyber-physical system 100 including a cyber controller 174 and a vulnerability assessment module 176. For example, the system 100 can be a supervisory control and data acquisition (SCADA) system, such as a power system. In the illustrated system, the power system includes a synchrophasor system having components in a physical domain and in a cyber domain, but as will be readily understood to one of ordinary skill in the art having the benefit of the present disclosure, other configurations of power systems are suitably adapted to use methods disclosed herein. The system 100 can be geographically distributed, including one or more remote assets 120 in communication with a control center 170. The remote assets 120 can be but are not limited to being electrical sub-stations of an electrical generation and transmission system, cellular base-stations in a telecommunications network, medical equipment and systems in a hospital, and so forth.

The system 100 can include communication connections (e.g., network 160 and dedicated control path) to create a SCADA network to enable the implementation of a closed-loop control system between multiple, geographically dispersed remote assets 120 and a control center 170 connected to one another using technologies such as fiber optics, microwave, Ethernet, and/or twisted-pair connections. The remote assets 120 can include measurement devices and/or sensors for measuring properties of the systems within the remote assets 120. Measurement signals originating from remote stations 120 can be relayed to the control center 170 by network devices 162 using a communications protocol, such as Internet Protocol (IP) based communication protocols (e.g., Distributed Network Protocol (DNP)). Similarly, control commands determined by processing these measurements can be sent back from the control center 170 to the remote assets 120 for execution, such as by the control logic 122. For some applications (e.g., fault protection), the different remote assets 120 can directly communicate with each other.

The interconnection network 160 can be utilized to interconnect various electrical components of the system 100 and the control center 170. The interconnection network 160 can include one or more network devices 162, such as switches, routers, and so forth. The interconnection network 160 can include plain old telephone service (POTS) signal lines, a local-area network (LAN), a wide-area network (WAN), and/or the Internet, for example. As a specific example, the interconnection network 160 can include multiple tiers of network infrastructure using routers and firewalls with site-to-site encryption, but local networks are unencrypted. It should be appreciated by one of ordinary skill in the art having the benefit of the present disclosure, that the network topology illustrated for the network 160 has been simplified and that many more networks and networking devices can be utilized to interconnect the various electrical components of the system 100. As illustrated, the network 160 is external to the remote asset 120 and the control center 170. However, the network 160 can include network devices that are integrated within the remote asset 120 and the control center 170. The cyber controller 174 can communicate with the network devices 162 to configure and/or reconfigure the network devices 162 to potentially improve cybersecurity of the system 100.

The remote stations 120 and the control center 170 can be protected by firewalls 150 and 172, respectively. A firewall is computer hardware, software, or a combination of computer hardware and software that separates and connects a more-trusted portion of a network from a less-trusted portion of the network. Firewalls can filter (e.g., selectively discard) communications packets based on network protocol information, among other things. The firewalls 150 and 172 can include software, a processor, a microcontroller, programmable logic (e.g., a field-programmable gate array (FPGA)), hardwired finite state machines, programmable microcode, or other suitable control circuits for filtering communications packets. As one example, a firewall can be configured with a table of network addresses that can be forwarded or blocked by the firewall. As another example, a firewall can be configured to block different port numbers associated with an IP packet. The cyber controller 174 can communicate with the firewalls 172 and 150 and configure and/or reconfigure the firewalls to potentially improve cybersecurity of the system 100 by changing an attack surface of the system 100. For example, the cyber controller 174 can program the firewalls 172 and 150 to enable or block particular network addresses, to open or close communication ports, and so forth.

Sensors can be used to perform real-time measurements of physical properties of systems of the remote asset 120. As a specific example, the remote asset 120 can be an electrical asset that is part of an electrical generation and transmission system. Inputs and/or outputs of the electrical components within the remote asset(s) 120 can be measured by a sensor, such as a phasor measurement unit (PMU). A PMU is a device that can be used to measure or estimate a magnitude and/or phase angle of an electrical quantity such as voltage or current using a common time source for synchronization. By using a common time source, the measurements of a given component can be synchronized for the component and across different components. Thus, a synchronized measurement of the system 100 can be taken across all of the components of the system 100. One method for synchronizing the measurements is by using a Global Positioning System (GPS) reference source.

The central controller 170 can include a firewall 172, a cyber controller 174, a vulnerability assessment module 176, and additional computer systems 178 (such as a phasor data concentrator (PDC), human resources, operational, monitoring, and maintenance computer systems, and so forth). The firewall 172, the cyber controller 174, the vulnerability assessment module 176, and the additional computer systems 178 can communicate with each other over direct connections, a local unencrypted network, or an encrypted network, for example. A PDC can collect and synchronize synchrophasor data and other information from the various electrical components of the system 100, correlate the data from the various electrical components, and pass the correlated data to monitoring and/or control logic. The monitoring and/or control logic can be executed on a processor (not shown) that can generate control signals that control equipment and systems of the remote assets 120. The control signals can be communicated to the remote assets 120 via the network 160 or via a dedicated control path. For example, the control signals can be received by the control logic 122 and used to change operating parameters of the components within the remote assets 120. Human resources computer systems and databases can track information about employees such as working schedules, account privileges, passwords, and so forth. Maintenance computer systems can track when machines and other systems are due for or are offline for maintenance.

A cyber attacker can attack the system 100 at various points of attack depending on skills and goals of the cyber attacker and/or vulnerabilities of the system 100. The various points of attack of the system 100 can be referred to as an attack surface of the system 100. The attack surface can include network, software, hardware, and/or human vulnerabilities. For example, the attack surface can include various services available within the control center 170 (such as those executing on the additional computer systems 178), ports accessible over the firewalls 172 and 150, data being communicated between the remote assets 120 and the control center 170, the network devices 162, computer code communicating with the accessible ports, computer code that processes electronic mail and other files, user and administrative accounts for users of the control center, employees with access to the control center, and so forth.

The cyber controller 174 and/or the vulnerability assessment module 176 can be used to monitor and/or control elements of the attack surface of the system 100. The cyber controller 174 can monitor the attack surfaces of the system 100. The cyber controller 174 can directly control (e.g., reconfigure) elements of the system 100, such as the firewalls 150 and 172, the control logic 122 and/or the additional computer systems 178. For example, the cyber controller 174 can configure these elements by causing configuration data to be loaded onto one or more of the elements to change or reconfigure the respective elements.

The blockchain module 176 can perform operations for any combination of on-chain, off-chain, in-transit, data-at-rest scenarios described in further detail below using parallel and/or in-line connections. The blockchain module 176 can receive records from any of the remote assets 120.

The implementation of a BCI can include many features from the cybersecurity realm. An example is the use of artificial intelligence to correlate cyber activity patterns with attack graphs and in predicting the potential attack path with a degree of confidence. Security information and event management (SIEM) software can address problems associated with correlation and detection probabilities. Event and fault trees can be customized to account for variability within one or more domains. Other frameworks can aid in identifying failure propagation paths and delineating nominal from abnormal system behavior. An example of such a framework is Function-Failure Identification and Propagation (FFIP). The developed trees herein can be further customized for a variety of enterprise control systems; business specific process equipment data and configuration information can be mapped to the event tree. Fault and event tree structures can persist in an ASCII-text file format. Data associated with events (e.g., likelihood and vulnerabilities) can be stored in a database. The file format for structures and data together can be collectively called Models and Results Database (MAR-D). PRA software, such as CAFTA, can be used for the development of trees. Other tools can also be used.

Other examples of data that can be shared using disclosed BCIs include attack graphs or similar graph structures (e.g., Petri nets, Bayes nets, and Markov models) outside the module that can provide situational awareness information on demand and/or at the trigger of an event. Note that such structures can have different file formats. The execution of a cyber controller in an operational mode can use information on rank weights with a certain degree of confidence. The former may either be a confirmed fact, the result of a machine-learned analysis, or a combination of both. Asset vulnerability information can be obtained through mapping enterprise assets against a publicly available vulnerability database supported by a normalized scoring system or through an incident management system.

In some implementations, BCIs can implement an observe, orient, decide, and act loop theory. The cyber controller observes an intrusion, orients itself using disclosed vulnerability assessment methodologies, and acts to implement a security control within the bounds of a unified operating plan if running in autonomous mode or makes a recommendation for a human in the loop to consider.

Example Blockchain-Based Cybersecurity Solution (BCS)

Figure 2:
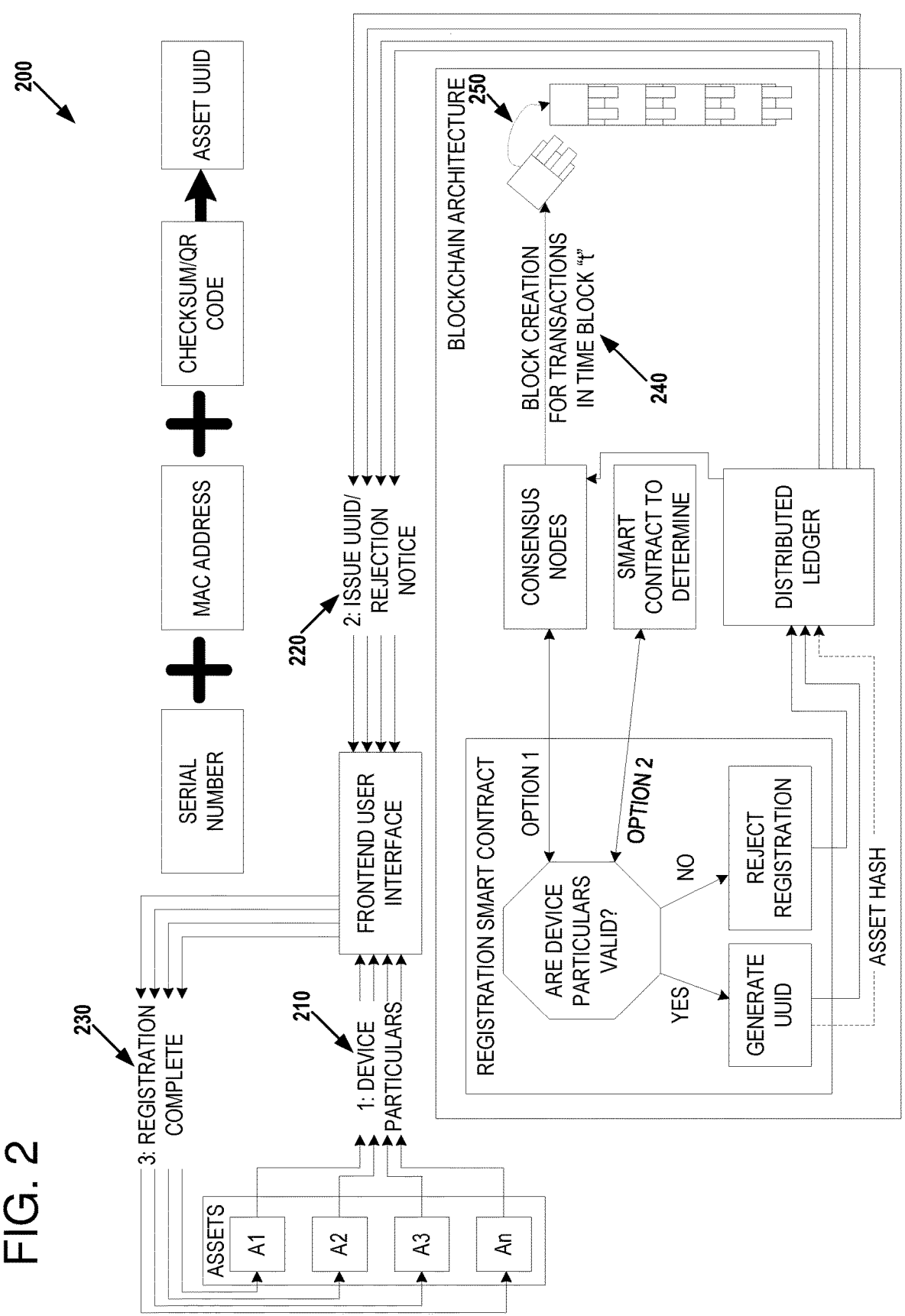
FIG. 2 is a block diagram illustrating an example process flow for asset registration.

FIG. 2 is a block diagram 200 illustrating an example of process flow that as used in certain implementations of the disclosed technology. As shown at 210, assets (A1-An) present their system specific information such as serial number, mac address, checksum/QR code to a frontend application. At 220, the information is addressed to a smart contract (called a registration smart contract) for the smart contract to process the information and generate a UUID. There are at least two ways to achieve this (note that the below options are compatible with any blockchain type and with all consensus mechanisms): (1) The smart contract can determine if the registrant information is valid and if the UUID is valid. (2) A group of consensus nodes can determine if the registrant information is valid and if the UUID is valid. At 230, a record of the UUID, associated hash, and any relevant asset information can be recorded. This can be achieved in at least two ways: (1) an off-chain database to store the record (asset UUID). A blockchain distributed ledger to store the hash of the record or (2) purely an on-chain process: the UUID and hash (if any) of the asset are stored on the blockchain's distributed ledger.

At 240, the transactions (in this case, the above process with inputs and output to the smart contract may be categorized as a transaction) for a defined time period are combined in a block. The block (and associated transactions) are approved by the consensus mechanism (proof-based consensus and/or voting-based consensus). At 250, the block is appended to the blockchain.

Figure 3:
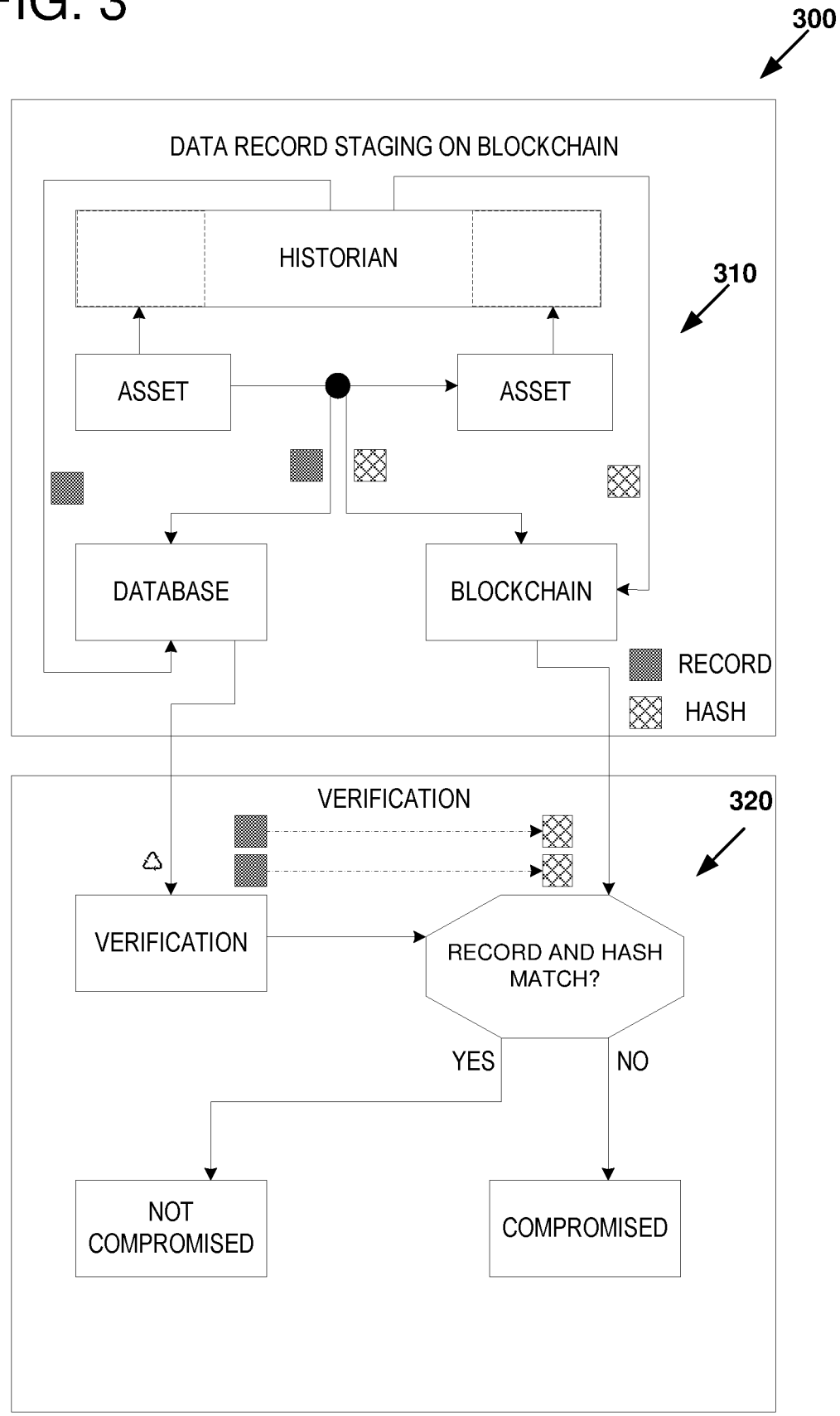
FIG. 3 is a block diagram illustrating an example process flow for data record staging on a block chain.

FIG. 3 is a block diagram 300 outlining example of data record staging on block chain, including verification, as can be performed in certain examples of the disclosed technology. As shown, disclosed utility architectures where assets communicate with their respective historians is unchanged. At 310, the historians are registered as the blockchain nodes. The historian records are cryptographically signed and staged in an off-chain database. A respective hash is on the blockchain. (For blockchain without off-chain capabilities, both the signed record and hash can be stored on the blockchain ledger as a transaction). At 320, an off-chain application or an on-chain smart contract can be set to periodically run and verify the records. The hashes of the cryptographically signed records are recomputed and compared against their hashes (computed at the first entry) in the blockchain. The YES and NO decisions are shown in FIG. 3.

Figure 4:
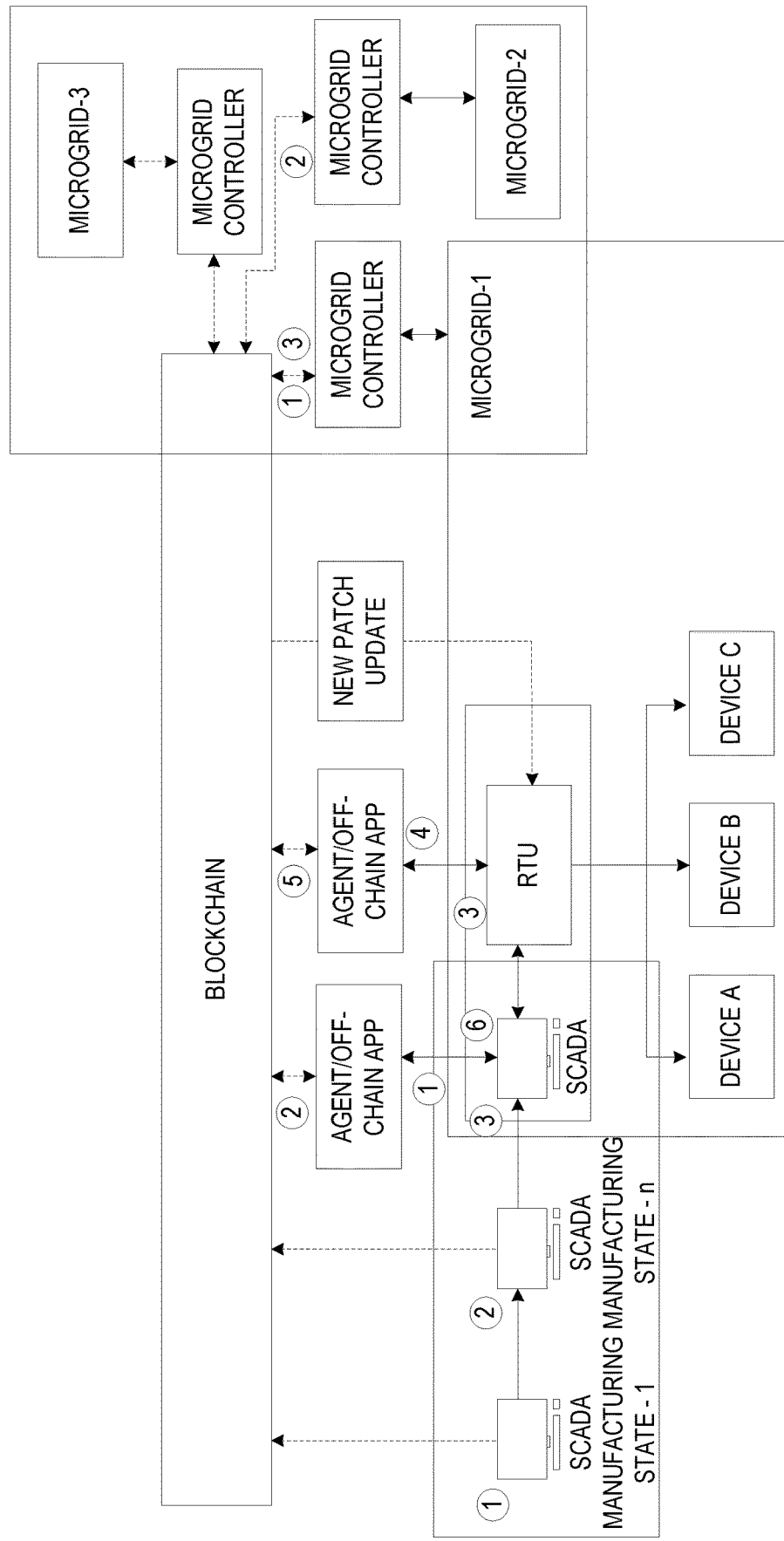
FIG. 4 is a block diagram illustrating an example control center architecture for a utility environment.

FIG. 4 is a block diagram 400 depicting a typical control center architecture where EMS/DMS, SCADA, RTU, etc. communicate by integrating the BCI system in a utility environment. Using disclosed BCI systems, the devices can continue to communicate with each other. The BCI system can be a parallel listener and validator system. In other examples, the BCI system can be integrated as inline solution. As the in-line solution, the devices may communicate through the BCI system where the packet is signed before being released to the receiving entity. Example BCI systems are compatible with traditional utility systems (transmission and distribution control centers and assets) and microgrid systems. Certain exemplary BCI systems can efficiently ensure secure communication between the microgrid controls and for remote DER coordination and control.

BCI systems can utilize cyber controllers to implement any of the disclosed monitoring and control functions. A cyber controller is hardware, software, or a combination of software and hardware that can be used to monitor and control a computer network. For example, the cyber controller can monitor equipment, systems, databases, and activity of the network and the computer systems attached to one or more computer networks, including IT networks and OT networks. An adversary may desire to disrupt the network and/or the attached systems. An adversary may desire to read or modify data that is stored on the system and/or transmitted within the network. The cyber controller can monitor a computer network to evaluate and classify potential threats to the network and to the attached computer systems. An adaptive cyber controller can reconfigure the computer network, such as in response to detecting a potential threat. For example, the adaptive cyber controller can change or reconfigure components of the network so that the network operates differently than before the reconfiguration. The adaptive cyber controller can receive or generate weights based on a set of criteria and use rank-weight methods, as described in further detail below, to change or reconfigure components of the network to mitigate cybersecurity vulnerabilities. For example, by changing operational parameters of the network, an adversary can be disconnected from the network, or be deceived or confused as to how to proceed with an attack. An autonomous adaptive cyber controller can perform a reconfiguration of the network automatically and without human intervention.

Adaptive cyber controllers can be used to add a layer of security to critical infrastructure systems (also referred to as operational technology (OT) systems) and demonstrate that OT systems can be secured using adaptive systems that are proactive, flexible, and dynamic in response to cyber threats/events. For example, an adaptive cyber controller can implement adaptive/dynamic defense concepts that deceive, confuse, or misinform adversaries. Such concepts include, but are not limited to, changes to the network, perimeters, segments, names, addresses, visible defense layers, and pathways. Specific cyber security sensors can be used to trigger the proposed dynamic defense or enable a manual trigger. The approach may increase security, reliability, robustness, and resilience of systems (e.g., power/water/oil/gas distribution systems, military components, and buildings) and their associated processes. The technology described herein describes risk management of adaptive autonomous cyber controllers.

In certain examples of the disclosed technology, BCI systems are used to secure OT or IT system, such as a water supply supervisory control and data acquisition (SCADA) system. Event trees can be developed to enumerate business consequences with intrusions and internal threats as initiators. For example, a representation of a SCADA system can be used with input and outputs illustrated between master terminal units and remote terminal units (RTUs). This framework can potentially improve cybersecurity planning practices, and has potential for applications in adaptive and autonomous settings.

As one example, a cyber-physical system can include multiple physical and computer systems that are interconnected by a computer network. The computer network can be monitored and controlled by a cyber controller. Accordingly, an adaptive, autonomous cyber controller can be combined with disclosed blockchain techniques. For example, BCI systems can be used in dynamic and autonomous environments for real-time operational purposes in safety critical industries. The technology can be applied to autonomous business systems (e.g., advanced nuclear reactors, asset automation, cyber-manufacturing, marine exploration and cloud-based SCADA systems). These types of systems can potentially benefit from strategies for facing cybersecurity challenges.

Figure 5:
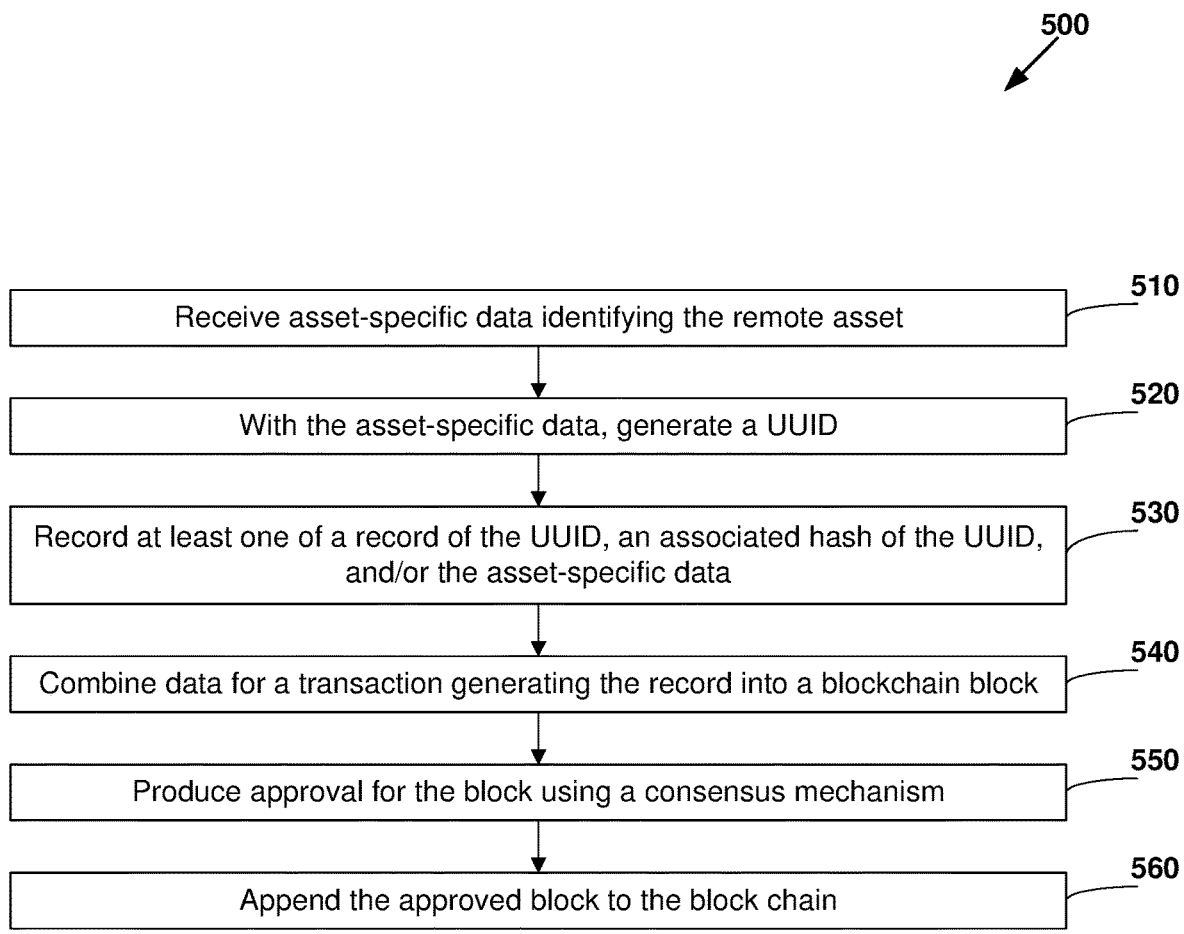
FIG. 5 is a flow chart for an example method of appending a block including assets-specific data identifying a remote asset to a block chain.

FIG. 5 is a flowchart 500 outlining an example method of appending a block including assets specific data identifying a remote asset to a block chain, as can be performed in certain examples of the disclosed technology. For example, any of the BCI computing systems disclosed herein can be used to perform the illustrated method.

At process block 510, asset specific data identifying a remote asset is received (e.g., by a blockchain controller). At process block 520, the controller generates a UUID with the asset specific data. For example, an asset identifier, such as a MAC address or other identifier associated with the asset may be combined with other data, such as a timestamp or other asset-specific data, in order to generate the UUID. At process block 530, a record of at least one of the UUID, an associated hash of the UUID, and/or the asset specific data is recorded. In this way, an asset-specific record may be stored for later validation purposes.

At process block 540, data for the transaction is combined to generate a block chain block. For example, transaction data such as date, time, transaction amount, transaction participant(s) (which may include anonymized identifiers or other identifying information), unique transaction codes, etc. may be included in and/or otherwise used to generate the block chain block. At process block 550, approval for the block is produced using a consensus mechanism. For example, the consensus mechanism may include a proof-of-work, proof-of-stake, proof-of-authority, proof-of-burn, and/or other mechanism. Example consensus mechanisms are described in more detail below. At process block 560, the approved block is appended to a block chain.

Example Blockchain Applicability Framework

As described above, blockchain technology may be applicable for a variety of industry sectors, including financial, food processing, and power and energy markets. For example, blockchain implementations configured according to disclosed methods of determining implementation recommendations of one or more blockchain applicabilities can include but are not limited to any of the following practical applications: secure sharing of data, including for any of the variety of disclosed sectors, facilitating payments, securing real-time embedded systems, cryptocurrency exchange, or logistics monitoring. Realizing the strength of blockchain technology beyond the successful application in the cryptocurrency arena, researchers have been evaluating and using blockchain for applications such as supply chain management, transactive industry (both financial and energy), system integrity, device cybersecurity, identity management, and much more. One of the unique elements of the blockchain technology that made it such a captivating technology to researchers is its plethora of features. Some of the features include smart contracts, cryptocurrency and tokenizing, immutable distributed ledger, cryptographic hashing, and digital signature. In addition, there are multiple types of blockchains, such as permissioned/private and permissionless/public, and various consensus models, such as proof-of-work, proof-of-authority, proof-of-burn, and proof-of-stake. Therefore, it is often non-trivial to determine if an application would benefit from a blockchain. If so, it is helpful to determine what kind of blockchain and consensus is most appropriate. Before investing resources into the adoption of blockchain technology, it is helpful to determine where this promising technology will be applied and what problem will be solved. If not implemented correctly, blockchain solutions can create unintended difficulties. It can potentially expand security gaps rather than mitigate them, increase costs, increase latency, and increase energy use. Blockchain solutions that help track and secure large data sets are desirably energy efficient, economically viable, and interoperable. Cost, functionality, scalability, and cyber resilience are all important factors for the enterprise managers and application users to consider and evaluate prior to adopting blockchain technology for any application or use case.

This disclosure discusses the blockchain applicability framework (BAF), which is usable to answer those questions. For example, BAF may be used to assist the organizational owners, managers, engineers, and users in deciding whether blockchain is the right solution to their use case. BAF can serve as a preliminary evaluation tool and as a road map to determine when to use blockchain, what type of blockchain can benefit the application, and what consensus mechanism to adopt. BAF may be divided into five domains, 18 subdomains, and about 100 controls. It is configured to ingest detailed user requirements to perform a weighted evaluation that is built on mathematical constructs to determine the ideal combination of blockchain that is appropriate for an application. Along with the core logical formulation of BAF, this disclosure depicts the efficacy of BAF through two use cases.

In order to achieve the goal of modernizing the power grid, the electricity infrastructure in the United States may be subjected to new technologies to solve complex grid challenges. The first step towards achieving a smarter and safer grid is rigorous experimentation. Over the last several years, there has been tremendous interest in distributed energy resources (DERs), renewable sources, and microgrids, with an objective to make the grid more reliable and resilient. However, integration and coordination of those DERs add more complexity to day-to-day operations, let alone preparing for potential events that could cause disruptions in operations. Therefore, grid modernization may be better served by focusing and addressing factors such as reliability, resiliency, interoperability, and scalability.

Blockchain and Transactive Systems

One of the transformative areas that has gained a lot of interest is transactive systems. There have been several transactive systems mechanisms that have been investigated and developed to improve the market structure and operations considering both the consumers and producers. With the increase in DER integration and a potential future that encompasses a significant number of prosumers, researchers have been exploring technologies and platforms that enable safe and secure peer-to-peer transactions. Such a platform could potentially provide a fair ground to a multi-utility and prosumer market. One of the technologies that has gained a lot of attention, not only in energy transactive systems but also in several other areas, is blockchain technology. Both through theoretical analysis and small-scale experiments, blockchain is seen as a disruptive technology that can potentially incorporate various transactive energy mechanisms or schemes.

Blockchain technology is a mixed bag of great promise and speculation. This technology first gained attention from different sectors after its unprecedented success in its application in cryptocurrencies, such as Bitcoin, and public open-source blockchains, such as Ethereum. Since then, various industries, including the food and pharmaceutical industries, financial industries and the banking sector, and data security entities, started investing in experimenting with blockchain. In the recent years, blockchain technology has been spreading its wings into the power industry, primarily due to some of its features, such as decentralized peer-to-peer mechanisms that eliminate third-party trust vectors, an immutable record of transaction that holds a tamper-proof record of the past, machine-executed smart contracts that can be designed with any requirements and constraints, and many more attributes. Although a lot of those attributes seem very promising, the technology itself is non-trivial to comprehend. Therefore, the interest groups of blockchain are spread across a wide spectrum—some call it a disruptive technology and often refer to it as internet 2.0, while others see it as technology that has caused some shimmers but may not be worth the investment. A very common trait that is found is that some of the blockchain users and enthusiasts cannot identify whether there is any need for blockchain in their application. Blockchain can be seen as one of the tools that can solve complex challenges. At the same time, it is easy to adopt this technology to an application that may not even need a blockchain. This disclosure provides an overview of the blockchain applicability framework (BAF), highlighting the structure and overarching design process of the framework—BAF walks a user (or an interested party) through ~100 controls to determine various factors, including: whether the application is suited to blockchain; if the application is suited to blockchain, whether it should use private blockchain or permissionless/public blockchain, and which consensus types are suitable, or most suitable, for the application. In some examples, the BAF may evaluate between four consensus mechanisms: proof-of-work, proof-of-stake, proof-of-burn, and proof-of-authority.

Various controls that are incorporated as part of BAF are configured by reviewing a variety of existing blockchains, their fundamental building blocks, the core differences in functionality, an expert analysis of a blockchain technology, and known information about consensus, among others. BAF can potentially assist researchers from various sectors and research areas, such as power, financial, supply chain, and data integrity, to make a sound decision on the use of blockchain technology for their application.

As described above, one goal of the blockchain applicability framework is to determine whether an application is suitable for application of blockchain or not (e.g., a blockchain usage option). Blockchain is a distributed ledger where transactions or activities between users from the same network are recorded in a secure, verifiable, and permanent way. If an application is suitable for blockchain, blockchain privacy options may be evaluated. For example, it can be determined what kind of privacy to use—either permissionless/public or permissioned/private. If anyone at any time can participate (reading or writing) in a blockchain without requiring approval, it is called a permissionless/public blockchain, whereas, a permissioned blockchain would provide full insight into the internal interactions of the organization by anyone who has an interest, but not to the public at large to interfere with the data. In addition, certain authority nodes or their equivalent may often permit the nodes to participate. Once the privacy type of blockchain is determined, the framework helps in discovering the type of consensus that may be most suitable for the application (e.g., blockchain consensus type options). Note that each consensus mechanism comes with some advantages and disadvantages that play a role in deciding on a consensus mechanism. In the described example, the framework understands the following four consensus mechanisms (however, it is to be understood that additional, fewer, and/or different consensus mechanisms may be evaluated using the BAF without departing from the scope of this disclosure):

1. Proof-of-Work (PoW): A blockchain user earns the right to publish the next block by solving a computationally intensive puzzle. The puzzle solution is seen as the "proof" that the user has performed work.
2. Proof-of-Stake (PoS): A blockchain user is randomly chosen depending on the amount of stake the user owns. The more stake a user has in a system, the more probability that the user will be chosen as a block creator.
3. Proof-of-Authority (PoA): A blockchain user earns the right to write the next block if it acquires the required approval from the authority nodes (list of validators).
4. Proof-of-Burn (PoB): A blockchain user earns the right to write the next block by sending their cryptocurrency to a non-spendable address by effectively burning them.

To ensure clear categorization of controls, the blockchain applicability framework is divided into five domains in the described example (it is to be understood that additional, fewer, and/or different domains may be included in the BAF without departing from the scope of this disclosure):

1. Data and Participation (DP)
2. Technical Attributes (TA)
3. Security (SC)
4. Trust Parameters (TP)
5. Performance and Efficiency (PE).

Each of these domains are divided into multiple subdomains; several controls are attributed to those subdomains. The controls may be in question format; response to those controls (in the form of choosing a particular state) results in a local solution. A weighted cumulation of all the states results in a final decision. Detailed methodology is explained below.

Figure 6:
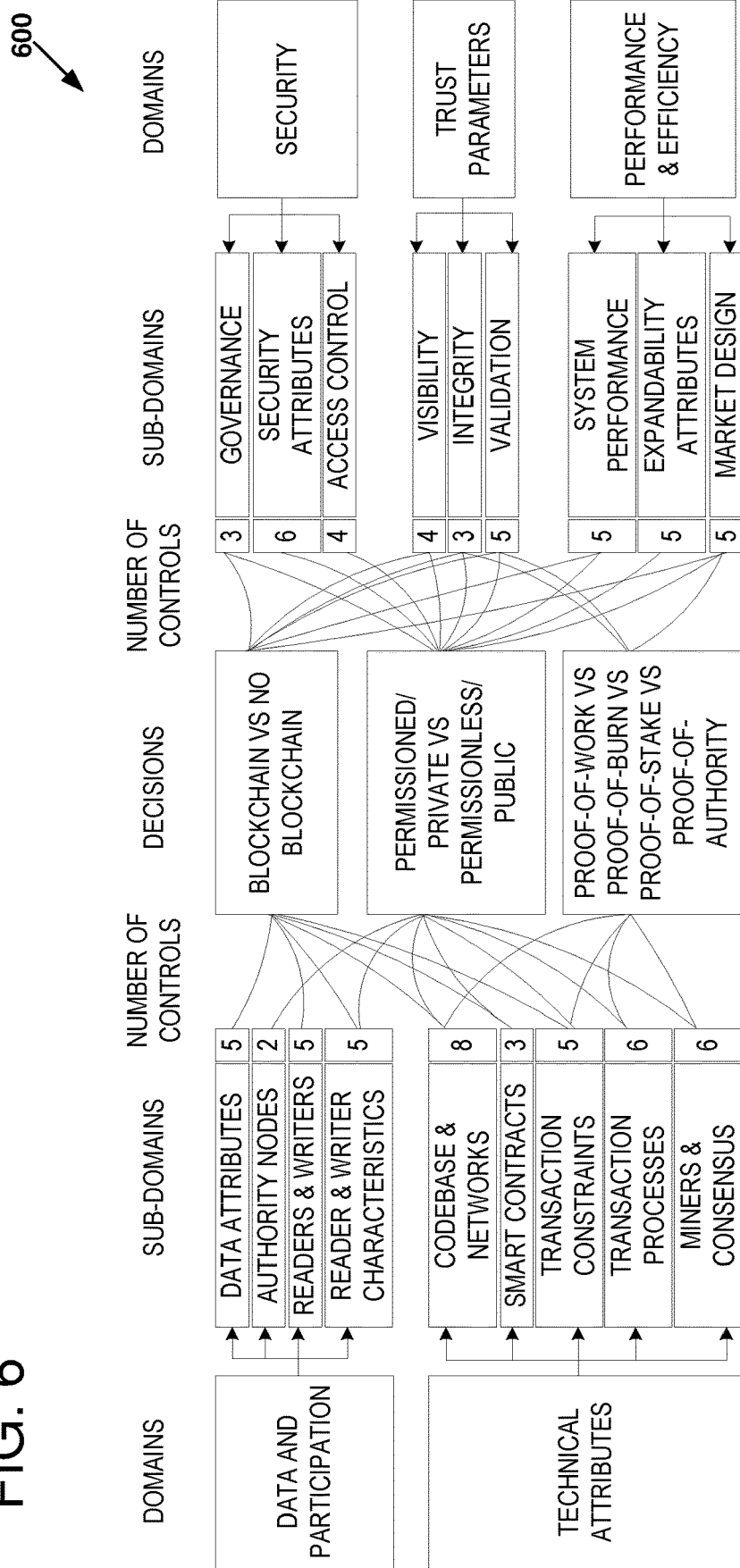
FIG. 6 illustrates an example architectural overview of a Blockchain Applicability Framework (BAF).

FIG. 6 shows an architectural overview 600 of the BAF, and the below sections describe each of the domains and their subdomains. In FIG. 6, the controls that belong to the subdomains below are shown under their respective subdomains. In the described example of BAF, there are three target classes representing blockchain usage options, blockchain privacy options, and blockchain consensus type options, respectively: 1) Blockchain (Y) vs. No Blockchain (N); 2) permissioned/private (V) vs. permissionless/public (U); and 3) PoW (W) vs. PoB (B) vs. PoS (S) vs. PoA (A). The states are: Fully Applicable (F of weight 2), Largely Applicable (L of weight 1), Partially Applicable (P of weight 1), or Not Applicable (N of weight 2). A control may have multiple class annotations. Such multiple annotations are only related to the control and those annotations do not hold any dependency or relationship to each other. A single control does not cover the entire scope of the blockchain applicability. Therefore, the responses to all the controls together defines the scope of blockchain applicability towards an application. Further delineations of certain controls are presented in Table 1. A control with further delineation is suffixed with the phrase "[see Table 1]".

TABLE I

Shows the delineations of certain controls to mitigate the complexity associated with those controls.

| ID | Delineation |
|---|---|
| 6 | Response to this control will determine a weighted requirement to have authority nodes |
| 10 | Reader is an entity which participates in transaction creation process; reading, analyzing or auditing the blockchain |
| 11 | Writer is an entity which participates in the consensus protocol; accumulate transactions within a block and add this block to the blockchain, and therefore, helps growing the blockchain |
| 12 | Several private/permissioned blockchains have features to enforce rules to define and differentiate the roles and responsibilities of the participating nodes. Depending on the application and to the discretion of the user, such enforcement of role-based rules may be non-trivial and may not be ideal in blockchains with a large number of independent writers due to immense overhead. |
| 20 | There are multiple permissioned blockchains that are open source (especially during the early year of the blockchain hype)- e.g., many can be observed in the Hyperledger platform. However, over the past few years, there has been a significant increase in the investment interests from venture capitalists (VC) in blockchain companies (both from development and application side). It can be observed from the latest statistics that there has been significant growth in VC investments to develop proprietary blockchains that are permissioned and not open source. |
| 21 | For example: Code is contained in transactions which represents a simple program specifying that particular transaction |
| 23 | For example: Two users may receive different versions of the same file without even realizing it |
| 25 | The ledgers in permissionless blockchains are massively distributed as any user can join a node in the network at any time and participate in the blockchain |
| 28 | Approved users who can create smart contracts may also have restricted access in permissioned blockchain |
| 31 | In a typical private PoA blockchain, the nodes cannot join the blockchain network as authority nodes unless authorized. The goal of this control is to capture the user response emphasizing that only the authorized nodes can participate in aspects such as transaction validation & consensus |
| 33 | Users have to pay relatively larger amount of transactional fee in permissionless blockchain than in permissioned blockchain to carry outtransactions |

TABLE I-continued

Shows the delineations of certain controls to mitigate the complexity associated with those controls.

| ID | Delineation |
|---|---|
| 37 | The goal of this control is to determine if there is a strong need for the blockchain transactions to be highly secure. This may lead to some compromise on type of blockchain architecture to use |
| 39 | Transactional frequency refers to the number of confirmed transactions per day. Short may refer to 100x ms; Long may refer to 10 minutes or more |
| 40 | Miners are the users who validate transactions and record them on the blockchain |
| 44 | The goal of this control is to determine if anyone participates in the process of block verification and consensus in the blockchain and which new block gets added to the blockchain is decided through consensus protocol |
| 58 | The goal of this control is to determine if there is a need to have presence of privacy and security controls on data |
| 65 | The goal of this control is to determine if a user, at any time, can join the blockchain, validate transactions, create smart contracts, and gain access to data that may be stored in a distributed file system |
| 68 | The goal of this control is to determine if all the nodes are required to have complete transparency of the operations such as exchanges, transactions, etc. between nodes |
| 69 | The goal of this control is to determine if there is a need of medium to long term confidentiality with respect to writing sensitive information to the Blockchain |
| 75 | In Proof-of-Authority, only authorized nodes participate in validation, but users can disclose their identity and get the right to validate |
| 78 | The time taken by date to travel from its point of origin to point of destination is referred to as latency |
| 80 | Throughput is the amount of data passing through a system |
| 82 | Efficiency relates to fast transaction confirmation and low latency |
| 86 | For example: which consensus protocol should be adopted, how they can make the blockchain operation faster and more efficient, etc. In Private Permissioned it is easier to make such decisions because there are only known, authorized nodes doing so. |
| 87 | Blockchains have a set of rules such as, transaction formats, block formats, built in limits, etc., defining the blockchain. Changing the rules could lead a blockchain to fork permanently where, all the nodes may not be able to or do not want to participate. The division in two groups leads to a fork and the chain splits. If a software update is released, where the old and new versions are not compatible, then it is very likely that there are going to be two camps: a) Updating the software; and b) Not updating the software |
| 89 | Price volatility gives a measurement of price movements over time for a traded financial instrument or asset. |
| 90 | Users/nodes whose identity (and reputation by extension) is at stake for the securing of a network are incentivized to preserve the network |

Domain 1: Data and Participation (DP)

Data Attributes (DP.DA): The controls in this subdomain emphasize data attributes such as the requirements for data storage; the type of data storage, which may depend on the source of data; and the likelihood of data storage violations. Evaluation of this subdomain may include determining whether there could be requirements to modify the historical data. This subdomain contains fundamental and critical controls. "Data" is the key attribute in any blockchain application. Flawed architecture or an incorrect implementation of a certain blockchain can lead to unintended consequences, such as lack of scalability, cybersecurity challenges that may be incurred due to lack of anonymity, improper identity, access, and data management. Therefore, the controls of this subdomain focus on assessing one set of two possible outcomes: blockchain vs. no blockchains.

Example evaluation questions (controls) and associated possible answers for this subdomain are shown below (as shown, in the following examples, fully[F] and largely[L] applicable are grouped together and partially[P] and not[N] applicable are grouped together for possible responses; in other examples, granularity of evaluation may be increased by assigning different values to each level of applicability, as will be described in more detail below):

|   | Controls | F/L | P/N |
|---|---|---|---|
| 1 | Is there a need to store data? | Y | N |
| 2 | Is all the data coming from a single entity? | N | Y |
| 3 | Does a traditional database technology meet the needs? | N | Y |
| 4 | Is the database likely to be attacked? | Y | N |
| 5 | Is there a need to modify historical data? | N | Y |

Authority Nodes (DP.AN): Authority nodes is a common term used in several constrained blockchains. The implication of the word "constrained" in this scenario is that there may be a set of overarching nodes that have complete control of various aspects of the blockchain, such as letting other nodes participate in the blockchain, forming consensus in transaction approval and block creation processes, and even retiring or eliminating the nodes out of the blockchain. In other words, these are the nodes with the authority to provide any access to the other nodes in the blockchain. The controls in this subdomain evaluate the requirements of authority nodes in a specific application pertaining to data storage and data maintenance aspects. The controls do not delve into consensus mechanisms; this is done in a later domain/subdomain. Therefore, this subdomain focuses on assessing one set of two possible outcomes: permissioned/private vs. permissionless/public. Factors, such as the requirement of having authority nodes in the blockchain, the ability for all the nodes to read and write, could potentially imply permissioned/private blockchain. Factors contrary to the above requirement may imply permissionless/public blockchain. Example evaluation questions (controls) and associated possible answers for this subdomain are shown below:

|   | Controls | F/L | P/N |
|---|---|---|---|
| 6 | Is there a need to have authorized access in the blockchain such that there is access control over which of the data is public and private? [see Table 1] | V | U |
| 7 | Is there authority nodes to maintain the database in the blockchain? | V | U |

Readers and Writers (DP.RW): Readers are entities that participate in processes such as performing transactions and reading, analyzing, or auditing the blockchain content. Writers are entities participating in the consensus protocol to help the blockchain grow by accumulating transactions within a block and adding the block to the blockchain. The controls of this subdomain analyze the role of a user after becoming a participant (specifically readers and writers), the requirement to have an approval process to join the blockchain as readers/writers, and the requirements around finite defined writer participants and their ability/inability to update the data. This subdomain focuses on assessing two sets of two possible outcomes (in each set): blockchain vs. no blockchain and permissioned/private vs. permissionless/public. Example evaluation questions (controls) and associated possible answers for this subdomain are shown below:

|   | Controls | F/L | P/N |
|---|---|---|---|
| 8 | Are there multiple parties/participants? | Y | N |
| 9 | Is there a need for more than one participant to update the data? | Y | N |
| 10 | Can any peer join the blockchain as a reader without needing approval at any time? [see Table 1] | U | V |
| 11 | Can any peer join the blockchain as a writer without needing approval at any time? [see Table 1] | U | V |
| 12 | Is there a need for a relatively large number of writers in the blockchain? [see Table 1] | U | V |

Reader and Writer Characteristics (DP.RWC): One of the strengths of blockchain technology lies in its ability to enable peer-to-peer transactions in a trustless environment where the peers may not know the identity of each other. In some constrained applications where there is an absolute requirement of authority nodes, it is possible that the identity of the readers and writers are known to all nodes. An example of such an application is the food-supply-chain, where known suppliers of the prime vendor are participating nodes of the blockchain. However, it may be understood that knowing does not imply trusting each other. In the above example, the nodes may know each other, but may not have a logical reason to trust each other. Deciding between identity revelation and trust leads to two determinations: 1) Is the application suitable for blockchain, and 2) should the application use permissioned/private blockchain. Therefore, this subdomain analyzes the issues around the known identity of the reader and writers, the associated trust among them, and any synchronization in the writer's interests. The controls for this subdomain evaluate across two sets of two possible outcomes (in each set): blockchain vs. no blockchain and permissioned/private vs. permissionless/public. Example evaluation questions (controls) and associated possible answers for this subdomain are shown below:

|   | Controls | F/L | P/N |
|---|---|---|---|
| 13 | Are the identities of the readers known? | V | U |
| 14 | Are the readers trusted in the system? | N | Y |
| 15 | Are the identities of the writers known? | V | U |
| 16 | Are the writers trusted in the system? | N | Y |
| 17 | Do the writers have unified or well-aligned interests? | NV | YU |

Domain 2: Technical Attributes

Codebase and Networks (TA.CN): Blockchain technology has several attributes or features, including smart contracts, distributed ledger, peer-to-peer transactions, consensus to validate transactions, token and cryptocurrencies, and many more. Although the use of some or all of these attributes are application dependent, certain aspects are useful to determine whether it is appropriate to use blockchain. For example, if there are no transactions or exchanges of information, there may be more efficient tools than blockchain. Other deciding aspects include the ability of all the nodes to view the transactions, authorization requirements to validate the transactions (block creation process), and associated parameters regarding block creation and transaction approvals. Blockchain is largely used in applications where third-party mediators are eliminated to enable a direct entity-to-entity transaction. However, there may be applications where the auditing parties are required to be an audience to all transactions. In such cases, it is helpful to determine the need and integration of auditors into the blockchain network, central management capabilities, and open-source core code, as well as the ability of the nodes to update the code, consistency in the experience gained by all the nodes, and the interaction among blockchain nodes towards a massive distribution of the blockchain network. The controls for this subdomain evaluate across three sets of multiple possible outcomes (in each set): blockchain vs. no blockchain, permissioned/private vs. permissionless/public, and PoW vs. PoS vs. PoB vs. PoA. Example evaluation questions (controls) and associated possible answers for this subdomain are shown below:

| Controls | | F/L | P/N |
|---|---|---|---|
| 18 | Is there an involvement of an online trusted third party (TTP) in the system? | N | Y |
| 19 | Is there a need to have the ability to manage the blockchain centrally, as needed? | V | U |
| 20 | Is the core blockchain code an open-source? [see Table 1] | U | V |
| 21 | Is there a need to have same people updating both the code and the blockchain? [see Table 1] | V | U |
| 22 | Is there a need that the blockchain nodes be uncertain about the exact number of nodes currently participating in the blockchain? | U | V |
| 23 | Is there a need to have the guarantee that all the nodes' experience with the blockchain to be consistent with each other? [see Table 1] | V | U |
| 24 | Does every node unrestricted full authority and capability to interact with other nodes by creating an address on the blockchain network? | U | V |
| 25 | Is the blockchain network massively distributed? [see Table 1] | UWBS | A |

Smart Contracts (TA.SC): This subdomain includes computer programs that manage the transfer of assets or value between blockchain users under defined rules and penalties related to the transfer. They may also be referred to as crypto-contracts. Controls in this subdomain cover the involvement and management of smart contracts and participation in the creation of smart contracts. The controls in this subdomain evaluate across two sets of two possible outcomes (in each set): blockchain vs. no blockchain and permissioned/private vs. permissionless/public. Example evaluation questions (controls) and associated possible answers for this subdomain are shown below:

| Controls | | F/L | P/N |
|---|---|---|---|
| 26 | Are policies and (smart) contracts involved and managed? | Y | N |
| 27 | Can anyone participate in the process of block verification and to create smart contracts in the blockchain | U | V |
| 28 | Do the blockchain nodes (who can create smart contracts) may also have restricted access? [see Table 1] | V | U |

Transaction Constraints (TA.TC): The controls of this subdomain determine if there is a necessity for transactions, establish authorization procedures and requirements to view and validate transactions, verify the need for a transactional fee, and establish a requirement for a decentralized consensus process to validate the transactions. Responses to these controls may lead to the suggestion of a permissioned/private or permissionless/public blockchain, as well as the type of consensus to prefer. Example evaluation questions (controls) and associated possible answers for this subdomain are shown below:

| Controls | | F/L | P/N |
|---|---|---|---|
| 29 | Are exchanges and transactions involved? | Y | N |
| 30 | Do the blockchain need to first provide the nodes with the rights to view the transactions? | V | U |
| 31 | Is there a requirement to get authorization to validate transactions in the blockchain? [see Table 1] | VA | UWBS |
| 32 | Is there a need for the transactions to be validated by votes/consensus? | Y | N |
| 33 | Is the transactional fee required to carry out transactions very small (or null)? [see Table 1] | V | U |

Transaction Processes (TA.TP): Beyond determining the need to have transactional processes in place, this subdomain focuses on efficiency vs. speed, encryption requirements, and other features. Responses to these controls may lead to the suggestion of a permissioned/private or permissionless/public blockchain, as well as the type of consensus to prefer. Example evaluation questions (controls) and associated possible answers for this subdomain are shown below:

| Controls | | F/L | P/N |
|---|---|---|---|
| 34 | Are the transactions private? | V | U |
| 35 | Are there high performance and fast transaction needs? | V | U |
| 36 | Is data-in-transit or transactions between the nodes need to be encrypted (or needs more encryption)? | V | U |
| 37 | Is there a strong need or emphasis on the security of the blockchain transactions? [see Table 1] | V | U |
| 38 | Is a time-consuming transaction verification process in the blockchain acceptable? | UWB | VAS |
| 39 | Is there a need for short transaction frequency in the blockchain? [see Table 1] | V | U |

Miners and Consensus (TA.MC): Miners are the users who validate transactions and record them on the blockchain. A consensus mechanism is a fault-tolerant mechanism used in blockchain systems to achieve the necessary agreement on a single data value or a single state of the network among distributed processes or multi-agent systems. Controls of this subdomain focus on issues such as the presence of miners, additional authorization on the selection of miners, the ability to become a miner at any time, the option of removing the miners to improve the speed and data storage capacity of the blockchain, the privilege of joining the consensus, and the requirement for all the nodes to participate in the consensus process. Responses to these controls may indicate the use of permissioned/private or permissionless/public blockchain along with consensus. Example evaluation questions (controls) and associated possible answers for this subdomain are shown below:

| Controls | | F/L | P/N |
|---|---|---|---|
| 40 | Is there a need for miners in the blockchain? [see Table 1] | VA | UWSB |
| 41 | Is there a need to have presence of an additional authentication and authorization layer on miners in place in the blockchain? | VS | UWB |
| 42 | Can any node join the blockchain at any time and become a miner? | UWB | VAS |

-continued

| | Controls | F/L | P/N |
|---|---|---|---|
| 43 | Is there a need to improve the speed and data-storage capacity of a blockchain by removing miners from it? | VA | UWSB |
| 44 | Can anyone join the protocol execution in the blockchain? [see Table 1] | UWB | VAS |
| 45 | Is there requirement for all the nodes to participate in the consensus process? | U | V |
| 46 | In an environment where anyone can be a miner, is there a requirement that certain miners should be prioritized over other miners? | S | WB |
| 47 | For more efficiency and less block creation time, is it acceptable for only certain nodes to have consensus power? | SAB | W |
| 48 | Is recursive hashing required for the consensus process? | W | SAB |
| 49 | For increased trust and ease of verifiability, is it acceptable (and required) if the nodes are required to sacrifice their tokens to form consensus? | B | WAS |
| 50 | Should the creator of the new block be chosen in a deterministic way such as wealth of the node, willingness for the node to sacrifice some wealth, etc.? | SB | WA |
| 51 | Is there a requirement for the miners to be rewarded for block creation? | WB | SA |
| 52 | For block creation, should the reward depend on the wealth burned to create the block? | B | WAS |

Domain 3: Security (SC)

Governance (SC.GV): Governance is an element pertaining to the security of the blockchain. This subdomain focuses on attributes related to the presence and absence of governance and censorship. The controls in this subdomain evaluate across two sets of two possible outcomes (in each set): blockchain vs. no blockchain and permissioned/private vs. permissionless/public. Example evaluation questions (controls) and associated possible answers for this subdomain are shown below:

| | Controls | F/L | P/N |
|---|---|---|---|
| 53 | Is there a need of censorship in the system? | N | Y |
| 54 | Is there a need to have a censorship-resistant blockchain? | U | V |
| 55 | Is lack of governance in the blockchain acceptable? | U | V |

Security Activities (SC.SA): These controls target security aspects and requirements pertaining to the transactional activities carried on to the blockchain network. Some of the factors include placing trust in authority nodes to maintain and ensure the security, determining requirements to maintain user data privacy without consolidating power with a single organization, providing security and privacy access control over public and private data, enabling block design without slowing the operation or threatening the security, and understanding security implications of the nodes joining the blockchain and their communication over authenticated channels. The controls of this subdomain focus on assessing one set of two possible outcomes: permissioned/private vs. permissionless/public. Example evaluation questions (controls) and associated possible answers for this subdomain are shown below:

| | Controls | F/L | P/N |
|---|---|---|---|
| 56 | Is there a need to trust authority nodes to secure the blockchain network? | V | U |
| 57 | Is there a requirement for the blockchain to maintain privacy of user data without consolidating power with a single organization? | V | U |
| 58 | Is there a need to have privacy and security access in the blockchain such that there is access control over which the data is public and private? [see Table 1] | V | U |
| 59 | Is there a need to hold more data in a block without slowing things down or threatening its security in the blockchain? | V | U |
| 60 | Arbitrarily, can any protocol participants drop off and new participants join in the blockchain without comprising with the security properties for newly joined nodes? | U | V |
| 61 | Is there a need for the communication between blockchain nodes to take place over authenticated channels? | V | U |

Access Control (SC.AC): This subdomain targets aspects such as the ability of a user to join the blockchain without authorization and the ability to participate in transaction validation and smart contract creation. This subdomain also incorporates controls related to access to data that may be stored in a distributed file system. Responses to those controls result in the preference of either permissioned/private or permissionless/public blockchain. Example evaluation questions (controls) and associated possible answers for this subdomain are shown below:

| | Controls | F/L | P/N |
|---|---|---|---|
| 62 | Is there a need to control who can make changes to the blockchain software? | V | U |
| 63 | Is the blockchain history open to any participating node (without the need of authorization)? | U | V |
| 64 | Is there an open access to read the information but require permission to access or transact on the blockchain network? | V | U |
| 65 | Is there a need to have a borderless blockchain? [see Table 1] | U | V |

Domain 4: Trust Parameters (TP)

Visibility (TP.VS): The controls in this subdomain question the visibility of the system/blockchain to users/nodes. Evaluation of this subdomain may determine the need for a fully transparent system (all the system operations to be available for the users to see), establish the approval process regarding the authority nodes, and provide a restrictive view of the blockchain transactions/information for some nodes in order to maintain confidentiality of the sensitive information. Assessment by this subdomain results in determining the need for a blockchain and the type of blockchain to be used, such as permissioned/private or permissionless/public. Example evaluation questions (controls) and associated possible answers for this subdomain are shown below:

| | Controls | F/L | P/N |
|---|---|---|---|
| 66 | Will all the nodes have different view of the system state based on the centralized system decision? | N | Y |

-continued

| Controls | | F/L | P/N |
|---|---|---|---|
| 67 | Will all nodes have the same view of the system state of the blockchain without requiring approval? | U | V |
| 68 | Is there a need for a fully transparent system? [see Table 1] | Y | N |
| 69 | Is it required for some nodes to not see information/transactions performed on the blockchain? [see Table 1] | N | Y |

Integrity (TP.IG): Controls of this subdomain address the integrity of the data and transactions. This subdomain precisely targets the requirement of a centralized system to ensure data integrity, trust among peers regarding data integrity that does not require approval from the authority nodes, and presence of authority nodes to ensure the integrity of the transactions and the smart contracts architecture. Apt responses to these controls result in determining the need for a blockchain as well as the type of blockchain and consensus. Example evaluation questions (controls) and associated possible answers for this subdomain are shown below:

| Controls | | F/L | P/N |
|---|---|---|---|
| 70 | Is there a centralized system to ensure the integrity of the data? | N | Y |
| 71 | Are there authorized nodes to ensure the integrity of the transactions and architecture of the smart contracts? | VA | U |
| 72 | Can a peer without permission be trusted with the integrity of the data? | U | V |

Validation (TP.VD): These controls focus on "who can verify what?" Questions evaluated by this subdomain correspond to determining whether there a presence of a centralized system to verify the state change in the system, the ability to verify the blockchain state without requiring authorization from the authority nodes, the option to acquire "the right to validate" in exchange of respective identity disclose, the ability to publicly verify the blockchain content, or a requirement to elect a leader to validate transactions and extend the blockchain. Responses to these controls result in determining the need for a blockchain and the type of blockchain and consensus. Example evaluation questions (controls) and associated possible answers for this subdomain are shown below:

| Controls | | F/L | P/N |
|---|---|---|---|
| 73 | Can any node verify the change in the state of the blockchain system, without any additional authorization? | UWSB | VA |
| 74 | Is there a centralized system to verify the change in the state of the system? | N | Y |
| 75 | Can a blockchain user acquire "the right to validate" in exchange for their identity disclose (voluntarily)? [see Table 1] | VA | U |
| 76 | Are the content on the blockchain publicly verifiable? | U | V |
| 77 | Is there a need for the blockchain nodes to elect a leader, which will have the role of validating transactions and extending the blockchain? | A | WSB |

Domain 5: Performance and Efficiency (PE)

System Performance (PE.SP): The system performance subdomain addresses various parameters that include acceptable latency, throughput, efficiency requirements. Latency is defined as the time taken to confirm a transaction, throughput is defined as the rate at which the blockchain can confirm transactions, and acceptable efficiency may be defined based on the speed of the transaction (e.g., fast), confirmation, and latency (e.g., low). Example evaluation questions (controls) and associated possible answers for this subdomain are shown below:

| Controls | | F/L | P/N |
|---|---|---|---|
| 78 | Is compromise with the system performance in terms of latency acceptable? [see Table 1] | Y | N |
| 79 | Is slow system latency acceptable in the blockchain? | U | V |
| 80 | Is compromise with the system performance in terms of throughput acceptable? [see Table 1] | Y | N |
| 81 | Is there a need of high throughput in the blockchain? | V | U |
| 82 | Is compromise on the efficiency of the blockchain acceptable? [see Table 1] | U | V |

Expandability Attributes (PE.EA): This subdomain targets the following attributes and requirements: high immutability with access controlled by authority nodes, scalability, customizability, adaptability, and compatibility across different versions throughout blockchain lifecycle to avoid problems such as possible forking and chain splits. Example evaluation questions (controls) and associated possible answers for this subdomain are shown below:

| Controls | | F/L | P/N |
|---|---|---|---|
| 83 | Is there a need of high immutability with access controlled by authority nodes in the blockchain? | V | U |
| 84 | Is there a need for the blockchain to be able to scale easily? | V | U |
| 85 | Is there a need for the blockchain to have more customizability? | V | U |
| 86 | Is there a need for the blockchain to have more adaptation options? [see Table 1] | V | U |
| 87 | Is there a need to have compatibility across different versions throughput blockchain lifecycle to avoid problems such as possible forking, chain splits, etc. in the blockchain? [see Table 1] | V | U |

Market Design (PE.MD): This subdomain addresses probable issues associated with the markets related to the requirements of a contractual based market approach, price volatility (which gives a measurement of price movements over time for a traded financial instrument or asset), acceptable reputation risks as incentives for certain nodes, benefits outweighing the associated costs, and risks from a probable single point of failure. These risks can be evaluated to find the acceptable risks as per business needs. Example evaluation questions (controls) and associated possible answers for this subdomain are shown below:

| Controls | | F/L | P/N |
|---|---|---|---|
| 88 | Is a contractual based market approach needed? | Y | N |
| 89 | Is price volatility a concern in the blockchain? [see Table 1] | U | V |
| 90 | Are reputation risks of certain nodes accepted while incentivizing them? [see Table 1] | VA | U |
| 91 | Do the benefits outweigh the associated costs? | Y | N |
| 92 | Is the risk that originates from probable single point failure acceptable tradeoff as per business needs? | V | U |

Example BAF Decision-Making Methodology

Figure 7:
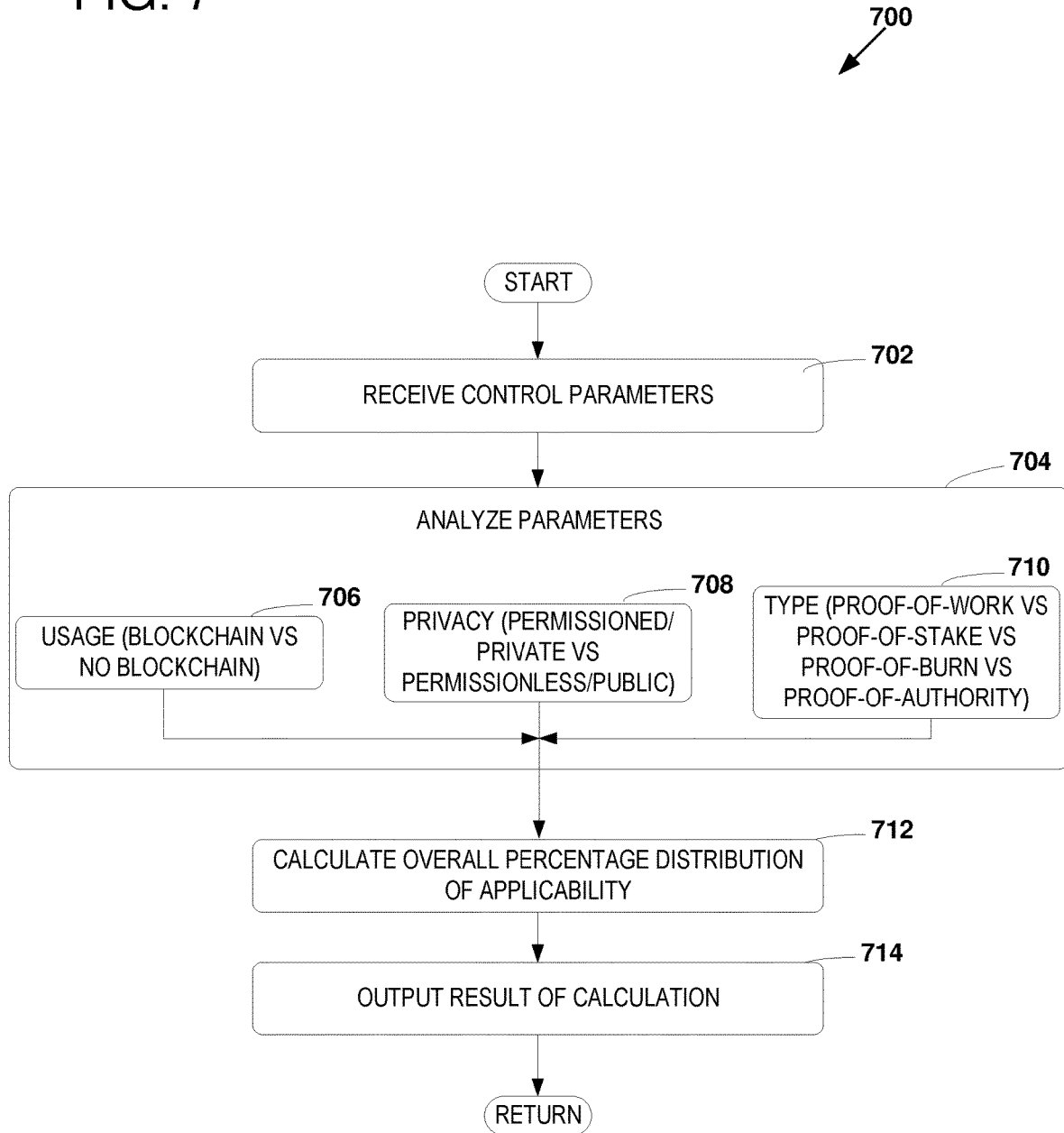
FIG. 7 is a flow chart for an example method of determining blockchain applicability using the BAF.

A high-level overview of the BAF decision-making methodology is shown in FIG. 7, and the respective algorithm is shown in "Algorithm-1: BAF Decision-making Algorithm," below:

01: Comparative Legend Array→$C_L$=list[block_noBlock, priv_pub, consens]
02: Sequentially loop through controls→for $C_i$, $\forall C_i \not\in \{C_{Total}\}$
03: Block_NoBlock→if $C_i \in C_L$ [0]
04: increment Block_NoBlock counter by 2→bnbCounter+=2
05: get sides of current $C_L$→$bnb_{sides}$=[Yes, No]
06: if $bnb_{sides}[0] \Rightarrow NI \| PI$
07: increment talley arrays per response→
  aa: if $C_i^{response}$=NI, $\{bnb[0]_{counter}^{response}$+=2$\}$; elif $C_i^{response}$=PI, $\{bnb[0]_{counter}^{response}$+=1$\}$
  bb: elif $C_i^{response}$=FI, $\{bnb[1]_{counter}^{response}$+=2$\}$; elif $C_i^{response}$=LI, $\{bnb[1]_{counter}^{response}$+=1$\}$
08: elf $bnb_{sides}[1] \Rightarrow NI \| PI$
09: if $C_i^{response}$=NI, $\{bnb[1]_{counter}^{response}$+=2$\}$; elif $C_i^{response}$=PI, $\{bnb[1]_{counter}^{response}$+=1$\}$
10: elif $C_i^{response}$=FI, $\{bnb[0]_{counter}^{response}$+=2$\}$; elif $C_i^{response}$=LI, $\{bnb[0]_{counter}^{response}$+=1$\}$
11: Private_Public→if $C_i \in C_L$ [1]
12: increment Private_Public counter by 2→ppCounter+=2
13: get sides of current $C_L$ $pnp_{sides}$=[Private, Public]
14: if $pnp_{sides}[0] \Rightarrow NI \| PI$
15: if $C_i^{response}$=NI, $\{pnp[0]_{counter}^{response}$+=2$\}$; elif $C_i^{response}$=PI, $\{pnp[0]_{counter}^{response}$+=1$\}$
16: elif $C_i^{response}$=FI, $\{pnp[1]_{counter}^{response}$+=2$\}$; elif $C_i^{response}$=LI, $\{pnp[1]_{counter}^{response}$+=1$\}$
17: elif $pnp_{sides}[1] \Rightarrow NI \| PI$
18: if $C_i^{response}$=NI, $\{pnp[1]_{counter}^{response}$+=2$\}$; elif $C_i^{response}$=PI, $\{pnp[1]_{counter}^{response}$+=1$\}$
19: elif $C_i^{response}$=FI, $\{pnp[0]_{counter}^{response}$+=2$\}$; elif $C_i^{response}$=LI, $\{pnp[0]$+=1$\}$
20: Consensus→if $C_i \in C_L$ [2]
21: increment Consensus counter by 2→ConsCounter+=2
22: get sides of current $C_L$ $Cons_{sides}$=[PoW, PoS, PoB, PoA, BFT, CFT, . . . ]
23: for i in length($Cons_{sides}$)
24: if $Cons_{sides}[i] \Rightarrow NI \| PI$
25: if $C_i^{response}$=NI, $\{Cons[i]_{counter}^{response}$+=2$\}$; elif $C_i^{response}$=PI, $\{Cons[i]_{counter}^{response}$+=1$\}$
26: elif $Cons_{sides}[i] \Rightarrow FI \| LI$
27: if $C_i^{response}$=FI, $\{Cons[i]_{counter}^{response}$+=2$\}$; elif $C_i^{response}$=LI, $\{Cons[i]_{counter}^{response}$+=1$\}$
28: Block_NoBlock %→($bnb[0]_{counter}^{response}$×100)/bnbCounter; ($bnb[1]_{counter}^{response}$×100)/bnbCounter
29: Private_Public %→($pnp[0]_{counter}^{response}$×100)/pnpCounter; ($pnp[1]_{counter}^{response}$×100)/pnpCounter
30: Cons %→for i in len ($Cons_{sides}$), {ConsAr.append(($Cons[i]_{counter}^{response}$×100)/ConsCounter)}

FIG. 7 shows a high-level flow chart 700 for an example method of determining blockchain applicability using the BAF described herein. The method can be performed by a suitable computing system, such as the cyber controller 174 and/or related computing systems described above with respect to FIG. 1 and/or the computing environment discussed in more detail below with respect to FIG. 11.

At process block 702, the method includes receiving control parameters relating to an application (e.g., a use-case) that is a candidate for using blockchain. The control parameters may include data/input from a user and/or other source indicating features of the application that may include and/or be useable to derive responses to questions of applicability (e.g., controls) of various domains/subdomains, such as those described above with respect to FIG. 6. Although shown as being received prior to analysis, it is to be understood that the parameters may, in some examples, include answers to applicability questions that are received during analysis (e.g., the analysis at 704, which will be described in more detail below).

At process block 704, the method includes analyzing the parameters. As indicated at process blocks 706-710, the analysis may be performed by (simultaneously or sequentially) evaluating usage applicability at process block 706 (e.g., determining applicability of blockchain versus no blockchain), evaluating privacy applicability at process block 708 (e.g., determining applicability of permissioned/private versus permissionless/public blockchain), and evaluating blockchain consensus type applicability at process block 710 (e.g., determining applicability of proof-of-work versus proof-of-stake versus proof-of-burn versus proof-of-authority).

At process block 712, the method includes calculating an overall percentage distribution of applicability for each of the decisions described above (e.g., usage, privacy, consensus). The overall percentage distribution may be determined based on a combination of weighted counts data for the different sub-domains and domains as described above.

Figure 9:
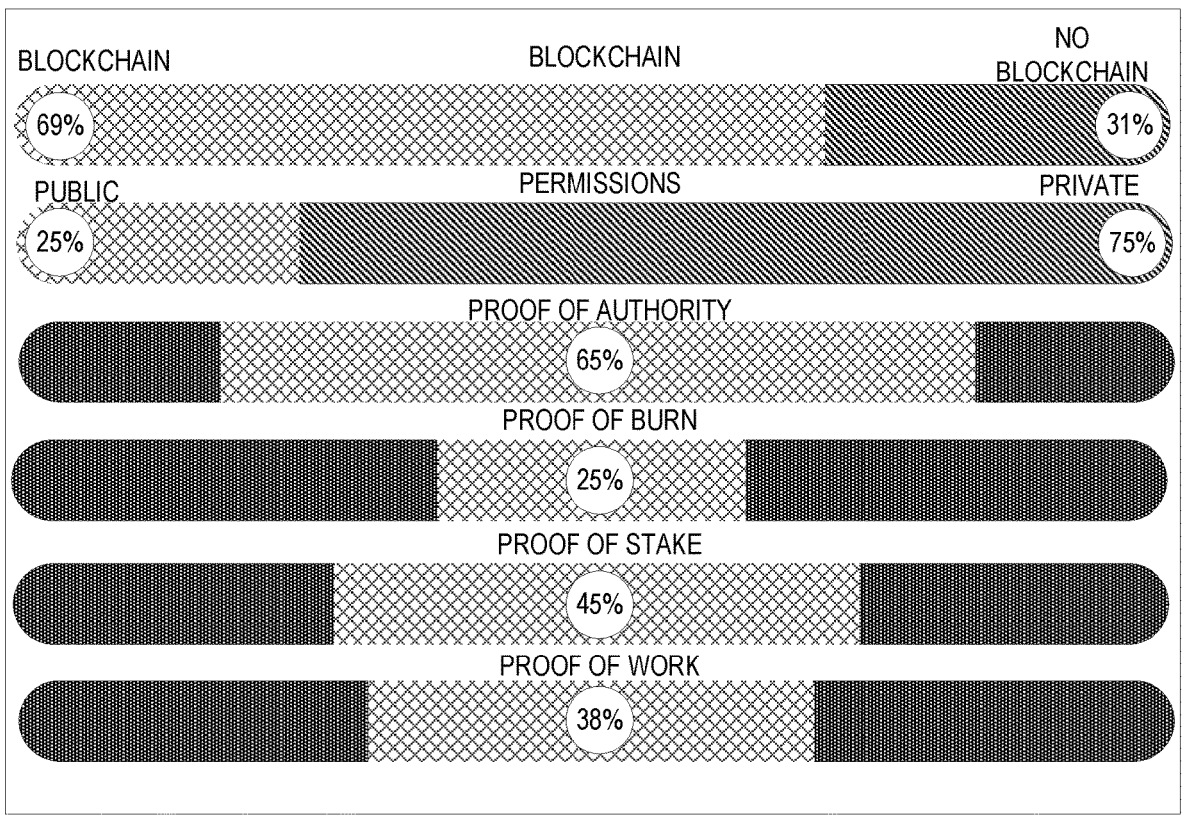
FIGS. 9 and 10 illustrate example graphical outputs indicating BAF-based determinations.
Figure 10:
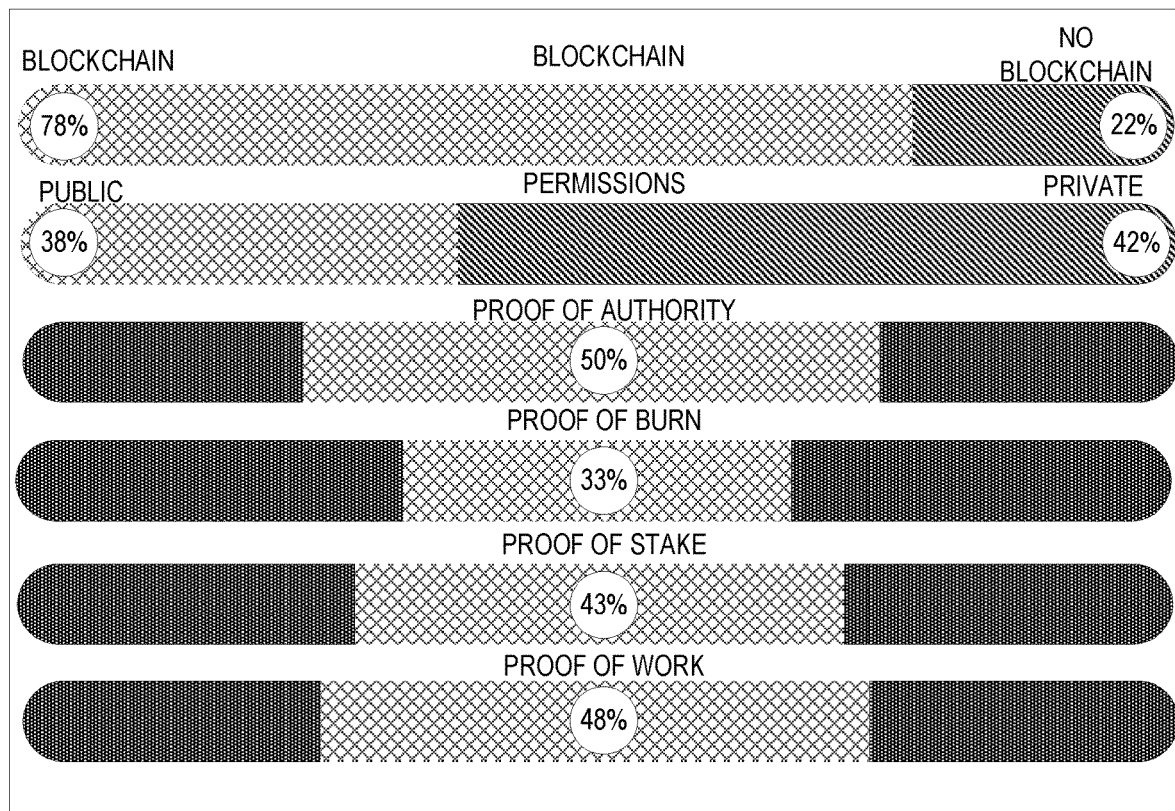

At process block 714, the method includes outputting a result of the calculation. As described below in more detail with regard to FIGS. 9 and 10 and associated use-case examples, the output may be in a suitable form to inform a user of the applicability of each of the decisions to the evaluated application based on the analysis performed at process block 704 and the calculation performed at process block 712. For example, the output may be a character-based output indicating counts for different levels of applicability for different sub-domains/domains (example syntax for such output is described below). In additional or alternative examples, the output may be graphical in nature, showing percentage applicability of each decision response (examples of which are shown in FIGS. 9 and 10 and described in more detail below).

Additional details regarding the assessment of applicability of blockchain to a selected application are provided below. As noted in the previous sections, the assessment process may begin with the user choosing a state for a control. One non-limiting example of the tool has 92 controls and each control has four states. These states are sequential from 1 to 4, with an equivalent representation of "not applicable" to "fully applicable". This relationship is shown in Equation (1):

$$\begin{pmatrix} S_1 \\ S_2 \\ S_3 \\ S_4 \end{pmatrix} \rightarrow \begin{pmatrix} 1 \\ 2 \\ 3 \\ 4 \end{pmatrix} \rightarrow \begin{pmatrix} \text{Not Applicable} \\ \text{Partially Applicable} \\ \text{Largely Applicable} \\ \text{Fully Applicable} \end{pmatrix} \rightarrow \begin{pmatrix} W_1 = 2 \\ W_2 = 1 \\ W_3 = 1 \\ W_4 = 2 \end{pmatrix} \quad (1)$$

where,
$S_1 \rightarrow S_4$ are four states of the controls, and
$W_1 \rightarrow W_4$ are the relative weights of states $S_1 \rightarrow S_4$.

A state is to be chosen for all the controls to generate the assessment results. As shown in Equation (2), until the end of assessment (E.O.A) is true, the assessment calculation continues, and the results are not generated:

$$E.O.A = \begin{cases} \text{True}, & \bigcap_{i=1}^{n} C_i^s = \text{True} \\ \text{False}, & \bigcap_{i=1}^{n} C_i^s = \text{False} \end{cases} \quad (2)$$

where, $C_i^s$ indicates a chosen state, s, for control i and $\bigcap_{i=1}^{n} C_i^s = \text{True}$ indicates that all the controls are assigned a state s. In such a case, E.O.A is True and assessment results may be generated.

Computation of Results—Example Base Methodology

In the example shown as Equation (1), there are four states for each control. States $S_1$ and $S_2$ belong to group $G_1$ and states $S_3$ and $S_4$ belong to group $G_2$. The combined states in both the groups $\{G_1, G_2\}$ have relative weight $W_i$, i∈{1,2,3,4} as shown in (3)-(6):

$$w_{max} = 2; W_{min} = 1 \quad (3)$$

$$\{S_1, S_4\} = W_{max}; \{S_2, S_3\} W_{min} \quad (4)$$

$$\{S_1, S_2\} \in G_1; \{S_3, S_4\} \in G_2 \quad (4)$$

$$\Rightarrow S_1 > S_2; S_4 > S_3 \quad (6)$$

As shown in Equation (6), for a particular control that may lean towards a particular group $G_i$, one of the two states should be chosen based on the estimated applicability strength. Ultimately, these weights may play a particular role in calculating the final solution. BAF final assessment results are spread across three sets of comparative legends: 1) $C_1$=Blockchain vs. No Blockchain, 2) $C_2$=Permissioned/private vs. Permissionless/public, and 3) $C_3$=Proof-of-work vs. Proof-of-authority vs. Proof-of-stake vs. Proof-of-burn. Certain controls belong explicitly to one of the legends, while some controls fit across multiple legends. The computation of decision for a particular comparative legend ($C_L$) is shown in Equations (7)-(10).

$$D_{denorm}^x = \sum_{j=1}^{n} W_s^j \quad (7)$$

where $D_{denorm}^x$ is denormalized sum of decision x in a $C_L$.

$$x \in \begin{cases} \{1, 2\}; & \text{if } (L=1) \| (L=2) \text{ in } C_L \\ \{1, 2, 3, 4\}; & \text{if } L=3 \text{ in } C_L \end{cases} \quad (8)$$

$W_s^j$ is resulted weight due to a chosen state s of a control j. $j \in \{D_F^C\}$ where $D_F^C$ is the family of controls that pertain to a comparative legend $C_L$.

$$D_{norm}^x = \frac{D_{denorm}^x}{\sum_{j=1}^{n} W_{max}^j} \times 100 = \frac{\sum_{j=1}^{n} W_s^j}{\sum_{j=1}^{n} W_{max}^j} \times 100 \quad (9)$$

where $D_{norm}^x$ is the normalized summation of decision x in a comparative legend $C_L$. See Equation (8) for the range of x. $W_{max}^i$ is maximum relative weight of a control j. According to Equation (3), the maximum relative weight of a control ($W_{max}$) is always 2.

Therefore, Equation (8) can be written as:

$$D_{norm}^x = \frac{\sum_{j=1}^{n} W_s^j}{2 \times C_L^T} \times 100; \forall C_L^T \in C_L \quad (10)$$

where $C_L^T$ is the total number of controls that pertain to a comparative legend $C_L$.

Note that for a comparative legend, $C_L$, a normalized decision, $D_{norm}^x$, is calculated for each of the possible decisions. Table 2 shows all possible decisions for each comparative legend. Once the $D_{norm}^x$ is calculated for all possible decisions, the recommended solution or path is the decision with the highest $D_{norm}^x$. Illustration: Following Table 2, for the comparative legend—"Blockchain vs. No Blockchain," if $D_{norm}^1$=75% and $D_{norm}^2$=25%, decision $d_1$ for comparative legend $C_1$ is "blockchain". Therefore, $d_1$=Blockchain.

TABLE 2

Comparative legends and decisions.

| Comparative Legend | Decision |
|---|---|
| Blockchain vs. | $D_{norm}^1 \in$ Blockchain |
| No Blockchain | $D_{norm}^2 \in$ No Blockchain |
| | Decision $d_2$ = max($D_{norm}^1$, $D_{norm}^2$) |
| Permissioned/private vs. | $D_{norm}^1 \in$ Permissioned/private |
| Permissionless/public | $D_{norm}^2 \in$ Permissionless/public |
| | Decision $d_2$ = max($D_{norm}^1$, $D_{norm}^2$) |
| Proof-of-work vs. | $D_{norm}^1 \in$ Proof-of-work |
| Proof-of-authority vs. | $D_{norm}^2 \in$ Proof-of-authority |
| Proof-of-stake vs. | $D_{norm}^3 \in$ Proof-of-stake |
| Proof-of-burn | $D_{norm}^4 \in$ Proof-of-burn |
| | Decision $d_2$ = max($D_{norm}^1$, $D_{norm}^2$, $D_{norm}^3$, $D_{norm}^4$) |

Figure 8:
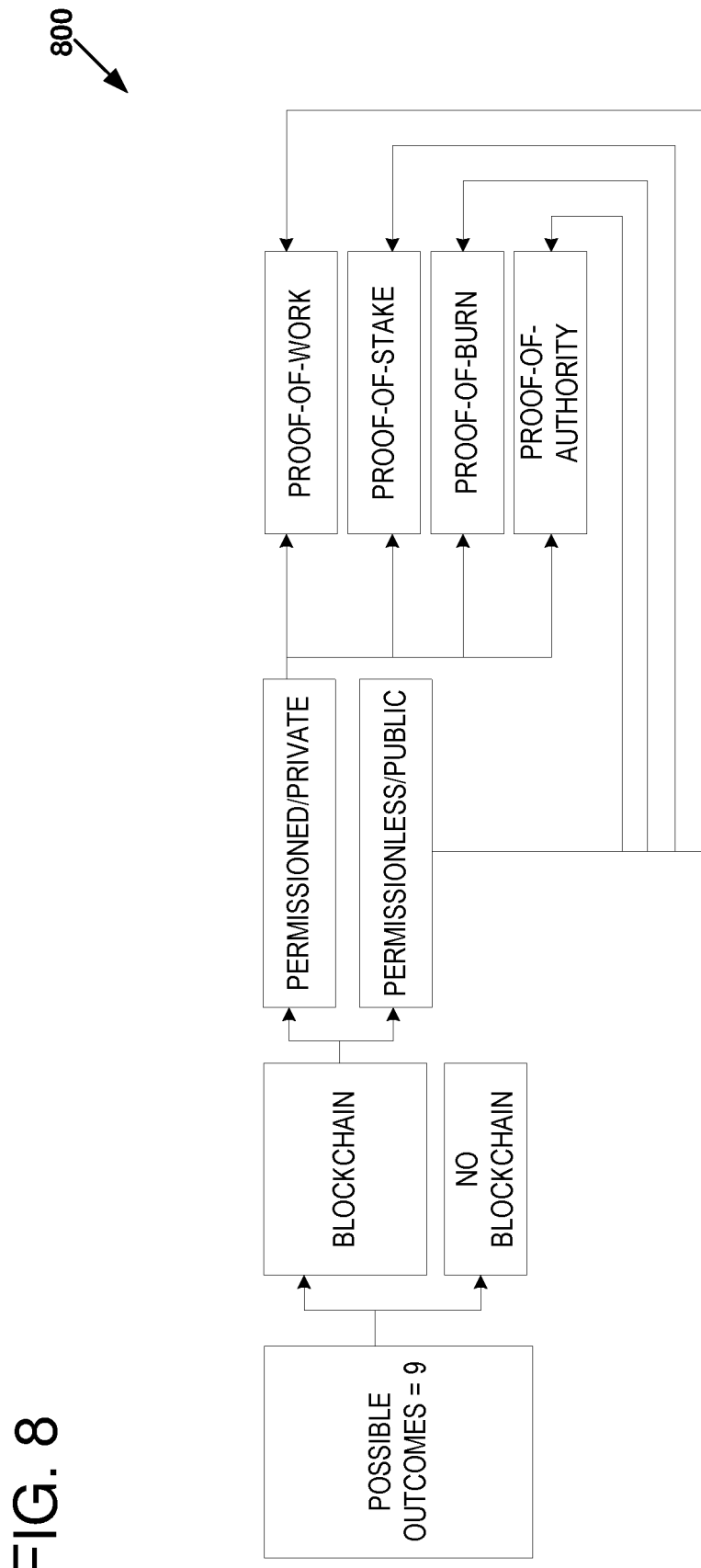
FIG. 8 illustrates an example map of possible outcomes for a BAF-based determination.

Based on the above calculations, there are a total of nine possible outcomes. FIG. 8 shows an example map 800 of the nine possible outcomes for the example BAF-based determination. As shown therein, a first outcome is for no blockchain (the other decisions are irrelevant for this outcome). Four possible outcomes exist for blockchain with permissioned/private access (e.g., one for each of the possible consensus types), and four possible outcomes exist for blockchain with permissionless/public access (e.g., one for each of the possible consensus types).

Criticality Based Method—An Example Extension of Base Methodology

Note that in the foregoing example, all the controls are treated at equal value. In other words, there was no hierarchical division of controls. In other examples, the BAF base methodology may be further refined to acquire more efficient and targeted results by assigning a criticality indicator level (CIL). Following the architectures of the cybersecurity capability maturity model (C2M2) and the cybersecurity framework (CSF) methodologies, all of the controls may be assigned one of the three levels: CIL-1, 2, or 3. By assigning CIL to the BAF controls, there may be a clear categorization of the controls based on their footprint and criticality towards the decision-making process. For example, with such CIL-based enhancement, all the high critical controls (CIL-3) such as control #5: Is there a need to modify historical data; control #8: Is there an involvement of an online trusted third party (TTP) in the system; control #18: Are there multiple parties/participants, etc. that will be weighted three times the low critical controls (CIL-1). Similarly, the medium critical control (CIL-2) will be weighted two times the CIL-1 controls. Therefore, the user responses to the high critical controls have significant impact on the decision-making process. In some examples, a comparative analysis between CIL-based and non-CIL-based BAF may be performed. In such a case, the formulation based on a normalized summation shown in (7)-(10) may be changed to adopt from the weighted averages approach. In a weighted average problem, the weighted mean ($\bar{x}$) of a non-empty set of data $\{x_1, x_2, \ldots, x_n\}$ can be calculated using the following equation:

$$\bar{x} = \frac{\sum_{i=1}^{n} w_i x_i}{\sum_{i=1}^{n} w_i} \quad (11)$$

where $w_i$ is non-negative weight of $x_i$.

Adopting Equation (11), the weights $w_i$ are the relative weights of each control; as discussed earlier, these relative weights are determined by a state chosen for a control. With the introduction of CIL, $x_i$ for a control is its CIL value and $x_i \in [1, 2, 3]$. Therefore, (7)-(10) may be modified to (12)-(15):

$$D_{denorm}^x = \sum_{j=1}^{n} W_s^j \times CIL^j \quad (12)$$

$$D_{norm}^x = \frac{D_{denorm}^x}{\sum_{j=1}^{n} W_{max}^j} \times 100 \quad (13)$$

$$\Rightarrow D_{norm}^x = \frac{\sum_{j=1}^{n} W_s^j \times CIL^j}{\sum_{j=1}^{n} W_{max}^j} \times 100 \quad (14)$$

$$D_{norm}^x = \frac{\sum_{j=1}^{n} W_s^j \times CIL^j}{2 \times C_L^T} \times 100 \quad (15)$$

Comparative Analysis

Blockchain researchers and users have developed various suitability and applicability models to evaluate the need for blockchain technology for an application. A detailed comparative analysis between BAF and other models that were designed to determine if blockchain technology is required for an application has been performed. The comparative analysis can be performed using different methods.

One example of comparative analysis is to compare all the models across the five domains: Data Participation, Technical Attributes, Security, Trust Parameters, and Performance & Efficiency.

A second example of comparative analysis is to compare all the models against six high-level parameters:

a. User-level (Does the model evaluate based on user-related requirements?)
b. System level (Does the model evaluate based on the blockchain network and interconnected systems-based requirements?)
c. Application-level (Does the model evaluate based on the application and its requirements?)
d. Need analysis (Does the model evaluate between blockchain vs. no blockchain?)
e. Type analysis (Does the model evaluate between permissioned/private vs. permissionless/public vs. other/hybrid?)
f. Consensus analysis (Does the model determine appropriate or most reliant consensus mechanism?).

Based on the above analysis, it is evident that the majority of other blockchain applicability models focus mostly on data related parameters, reader and writer requirements, and network parameters with some emphasis on trust parameters. There was found to be little to no emphasis on parameters related to authority node requirements, smart contract parameters, consensus processes and requirements, access controls, and market design. For example, some models consider one high-level factor related to market design. The user is required to answer if there is going to be any market approach. However, such models do not evaluate user requirements related to the core aspects of market design, such as price volatility, incentivization, and costs vs. benefits analysis. Most models focus on system-level requirements, and only some models focus on user-level requirements. Most models do not go beyond user & system level requirements and incorporates application-level requirements. The evaluated models were also fairly distributed in focusing on need and type analysis, with almost no emphasis on consensus analysis.

In relation to the above detailed comparative analysis between other models and the description of the BAF controls presented above, it is evident that BAF not only focuses on high-level user requirements, but also focuses on core technical aspects and parameters that are strongly related to system-level analysis. BAF performs a need analysis, a type analysis, and a consensus analysis. Such a collection of analyses is not found in any of the other evaluated models. BAF does not make a binary decision based on a single response to a single control. Instead, the BAF model evaluates the responses to all the controls and present the analysis to indicate the most likely or least likely. Other models perform only a binary analysis with a Yes or No end result. Since blockchain technology has several features, including immutable distributed ledger, smart contracts, cryptocurrency designability, multi-channel architectures with customizable access controls and visibility restrictions (similar to Hyperledger Fabric), auditability features, and other features, binary decision-making based on the response to a control could potentially lead to an oversimplification of the technology and its scope. Therefore, BAF determines a likely recommendation through percentage distribution (need for blockchain, type, and consensus) based on the weighted analysis across all controls. Because of the increased complexity and possible bias that may be introduced as the number of controls increase, BAF follows a relative-weighted approach where a particular state of a control is associated with a relative weight value of 1 or 2. BAF may be expanded to incorporate the ability to be customizable based on the application requirements, for example, by adding application-based controls to BAF. Although the examples of BAF described herein perform a consensus analysis considering four consensus mechanisms:

proof-of-work, proof-of-stake, proof-of-burn, and proof-of-authority, there may be other consensus mechanisms considered using BAF, such as voting-based consensus options (e.g., *Byzantine* fault tolerance-based consensus) and crash fault tolerance-based consensus. Note that according to line-22 in "Algorithm-1: BAF Decision-making Algorithm" presented above, the BAF software is flexible to incorporate other consensus models as they emerge into the blockchain research area. As shown in line-13 of the Algorithm referenced above, BAF is capable of incorporating other types (e.g., hybrid public/private).

Blockchain Cybersecurity Framework

Blockchain Cybersecurity Framework (BC2F) may be used to evaluate the cybersecurity of the environment (or node) that is going to be part of a blockchain application and may be used in coordination with BAF as described above. The output of BC2F highlights cybersecurity gaps and vulnerabilities to be addressed to ensure that cybersecure transactions are executed across the blockchain platform. BC2F also has a mathematical mitigation system that recommends the targeted cybersecurity posture based on the user requirements. This mitigation system has various elements such as rank-weight analysis, multi-tier solution discovery, prioritized gap analysis, and maturity determination based on a weighted performance score. The decision maker may rank each of the subdomains (otherwise referred to as criteria) in a prioritized order. Listed below are definitions of BC2F domains and subdomains that may be used in the evaluation according to the BC2F.

Identify—Asset Management (ID.AM): This criterion addresses aspects such as the ability to catalog the blockchain nodes and inventory of the blockchain assets (e.g., physical devices and systems, smart contracts). Architectural elements of this criteria include:
 a. Identification and mapping of data flows across various nodes during the transactional processes.
 b. Prioritization of blockchain nodes based on their involvement, criticality, and value added to the blockchain, and their frequency of transactions.

Addressing the above elements may lead to the establishment of cybersecurity roles and responsibilities for the blockchain nodes (e.g., reader, writer, validator, trusted third party, etc.).

Identify-Business Environment (ID.BE): This criterion addresses aspects such as the identification of roles for the blockchain nodes, their importance and criticality in the network participation, and prioritization of blockchain purpose, objectives, and activities. Effective communication of all this information may act as a prerequisite to the following:
 a. Establishment of dependencies and critical functions for successful operation of the blockchain.
 b. Establishment of blockchain resilience requirements to support cyber secure peer-to-peer transactions and execution of smart contracts.

Identify-Governance (ID.GV): This criterion addresses aspects such as awareness of security policy in the blockchain network and surveillance for fraudulent activities. This could potentially lead to the following:
 a. Coordination and alignment of security roles and responsibilities for all the participating nodes and the associated IT/OT infrastructure.
 b. Understanding and management of blockchain legal and regulatory requirements for cyber secure peer-to-peer transactions, privacy, and obligations of the participating nodes.

The above elements may assist in evaluating governance and risk management processes that can potentially address the cybersecurity risks posed to the blockchain nodes (and on the blockchain network).

Identify-Risk Assessment (ID.RA): This criterion addresses aspects such as obtaining threat and vulnerability information from information sharing sources to facilitate implementation of the following:
 a. Identification, documentation, and assessment of the blockchain vulnerabilities using a cyber secure risk assessment process.
 b. Identification and documentation of internal and external threats.
 c. Identification and documentation of threats and vulnerabilities to assist in determining potential business impacts and the likelihood of attacks.
 d. Obtaining information about identified threats, vulnerabilities, likelihoods, and business impacts and utilizing that information to determine possible risks to blockchain nodes and their transactions.

Using the above information, responses to the possible risks can be identified and prioritized.

Identify-Risk Management Strategy (RM): This criterion addresses aspects such as the management and agreement of established risk management processes by the list of validators (otherwise known as authority nodes) and the blockchain nodes to determine risk tolerance with respect to the blockchain (authority nodes are present only in proof-of-authority—consensus models such as proof-of-work do not have authority nodes; in such cases, all nodes may be treated with equal authority). Determination of risk tolerance may enable the blockchain nodes to be aware of its criticality and importance. This information can be used to determine if the nodes are required to meet the objectives of a security program or cybersecurity risk management plan associated with their contracts.

Identify-Supply Chain and Risk Management (ID.SC): This criterion addresses the following aspects:
 a. Assessment, management, and agreement of identified and established supply chain risk management processes by the authority nodes.
 b. Testing of response and recovery planning with the blockchain vendor and blockchain participants could lead to identification, prioritization, and assessment of the critical information about the suppliers and partners in the supply chain process using a cyber supply chain risk assessment process.
 c. The ability to obtain critical information about the suppliers and partners in order to test response and recovery plans with them. This can determine if the suppliers and partners are required to meet the objectives of the security program or cyber secure risk management plan defined by contract. Once the decision is made, the suppliers and partners could be monitored to verify if the objectives are met.

Protect-Identity Management and Access Control (PR.AC): This criterion addresses the following:
 a. Management of identities and credentials for authorized blockchain nodes and network integrity protection by incorporating network segregation (as required) to enable management of the physical and remote access to the assets in the blockchain network (this includes the blockchain nodes and other assets that are on the same network).

b. Verification of identities of the operating human participants in the blockchain by asserting the issued credentials in appropriate interactions. Verification of identities may assist in the access permissions, management and authorizations by incorporating the least privilege principle and separation of duties to facilitate access controls.

Protect-Awareness and Training (PR.AT): This criterion addresses the following aspects:

a. Understanding of cybersecurity roles and responsibilities by the physical and information security personnel to perform periodic evaluations of the blockchain nodes (including the list of validators or authority nodes).

b. Periodic inspection of the blockchain users, supplier/manufacturer, and associated partners to assess their awareness of roles and responsibilities.

Protect-Data Security (PR.DS): Implementing data leak protection may ensure that both data-at-rest and data-in-transit are protected. This criterion addresses aspects such as formal management of blockchain nodes and users throughout the process of removal, transfers, and disposition. This facilitates availability maintenance in the blockchain. Data leak protection and management of assets can also incorporate integrity verification.

Protect-Information Protection Processes and Procedures (PR.IP): Sharing effectiveness of protection technologies with users may allow them to verify:

a. Creation and maintenance of the baseline configuration of blockchain network systems to incorporate security principles and validate:
  i. Use of system development life cycle (SDLC) to manage assets participating in blockchain
  i. Appropriate placement of configuration change control processes
  ii. The process of maintenance and periodic testing of blockchain asset data backups.
b. Whether policy and regulations are met while deploying physical systems in the blockchain.

Policy and regulations regarding the blockchain nodes, maintenance, and periodic testing of information backups may ensure that data is maintained according to the established policy. Baseline configuration of the blockchain network systems, backups of the asset information, testing response and recovery plans, and development and implementation of vulnerability management plans may result in the establishment of strong protection processes.

Protect-Maintenance (PR.MA): This criterion addresses aspects such as periodic preventive maintenance of blockchain nodes (and networks) to prevent events such as unauthorized access.

Protect-Protective Technology (PR.PT): Protection of the blockchain assets and network may include:

a. Protection and restrictive use of removable media according to established policies.
b. Incorporation of the least functionality/privilege principle to the blockchain users by providing only essential capabilities.
c. Operation of all the blockchain nodes in predefined functional states (e.g., under duress, under attack, during recovery, normal operations) to achieve availability.
d. Determination, documentation, implementation, and review of audit and log records of all the blockchain nodes according to established policies.

Implementation of the above processes can potentially catch and regulate cyberattacks that target the wallet, nodes, and the transactions.

Detect-Anomalies and Events (DE.AE): This criterion addresses aspects such as the establishment and management of expected data flows and baselines across the blockchain network among the participating nodes. This could potentially assist in analyzing detected blockchain cyber events. This could also possibly result in gaining total understanding of the cyber-attack targets and methods. Data acquired from the analysis of detected cyber events can also be aggregated and correlated from multiple sources. Finally, impact determination of detected events on the blockchain can assist in the establishment of a threshold for cyber incident alert.

Detect-Security Continuous Monitoring (DE.CM): Monitoring the blockchain network and nodes include:

a. Monitoring of individual operations/activities performed by the participating nodes to
  i. detect malicious code for smart contracts
  i. detect unauthorized mobile code.
b. Monitoring for unauthorized nodes and unauthorized access attempts.

Detect-Detection Processes (DE.DP): This criterion addresses aspects such as testing and evaluating the blockchain nodes according to organization compliance requirements. Furthermore, this criterion also highlights the importance and implementation of various detection processes. Some of the high-level elements include:

a. Effective communication of the cyber event detection information to appropriate participating nodes. This can lead to ensuring accountability by defining the roles and responsibilities to delineate, differentiate, and ultimately detect a cyber event in the blockchain environment.
b. Continuous improvement of detection processes.

Respond-Response Planning (RE.RP): This criterion addresses aspects such as determining if a well-designed response plan is in place that incorporates blockchain nodes, associated data, smart contracts, participant identity, and the validity of the transactions.

Respond-Communications (RE.CO): This criterion addresses aspects such as consistency of reported events with established criteria. Some of the elements include:

a. Consistency of shared information with all the blockchain nodes along with the response plans.
b. Evaluation and implementation of processes to voluntarily share the information with the blockchain nodes to achieve broader cybersecurity situational awareness.

The above elements can facilitate the coordination among the blockchain nodes (especially among the list of validators or authority nodes) and stay consistent with the incident response plans.

Respond-Analysis (RE.AN): This criterion addresses aspects such as investigation of detected anomalies in the blockchain network. This includes verification of consistency in established incident categorization with the response plans. Consistency in incident categorization can assist in understanding impacts of cybersecurity events and in performing cyber forensics.

Respond-Mitigation (RE.MI): This criterion addresses aspects such as containment of the incidents detected in the blockchain network and availability of the necessary amount of time to mitigate events. This criterion also emphasizes documentation of the vulnerabilities and updating the list of accepted risks and response plans.

Respond-Improvements (RE.IM): This criterion addresses aspects such as periodically update response strategies to incorporate the lessons learned.

Recover-Recovery Planning (RC.RP): This criterion addresses aspects such as determining if a well-designed recovery plan is in place to recover the blockchain nodes and network. Test the smart contract executions for consistency and behavior checks.

Recover-Improvements (RC.IM): This criterion addresses aspects such as periodically update recovery strategies to incorporate lessons learned.

Recover-Communications (RC.CO): This criterion addresses aspects such as management of relations with associated entities in the blockchain through effective communication of recovery activities. This can expedite the repair of reputation after an incident.

Example Use-Case Test and Results

Blockchain technology can be applied to a plethora of use-cases. Examples of government use-cases of interest include but are not limited to: transparent governance, voting system, property rights validation, lottery, citizenship and immigration services, court proceedings, citizen benefit eligibility verification, birth, wedding, and death certificates, citizen records (e.g., licensing, criminal records, etc.), smart education system, and business processes (e.g., taxing, etc.). Examples of use-cases applicable to smart grids (e.g., power grids) related industries include but are not limited to: relating to transactive systems and demand response, policy and regulations compliance, auditing, billing services, configuration, software, and patch management, and secure autonomous data acquisition. Examples of use-cases applicable to financial services include but are not limited to: to asset management, trading, insurance processing, banking services, peer-to-peer transactions, and money lending. Examples of use-cases suitable to Internet-of-Things (TOT) industries include but are not limited to: device integrity, supply chain, device management, autonomous cybersecurity, patch management, smart automobile (vehicle-to-vehicle), smart sensor decentralized autonomous decision-making, and software and hardware license validation. Examples of use-cases suitable to data management and verification industries include but are not limited to organizational data security, secure historian, immutable event logging, proof of origin, history verification and validation, tamperproof data distribution, and transparent contract management. Examples of use-cases suitable to healthcare industries include but are not limited to: personal health records, access control, insurance processing, health status tracking and assistance, and common platform for hospitals, patients, and smart health monitors/devices/sensors.

Smart grid transactive systems: In one example a BAF was tested against a potential application in the smart grid transactive energy area. Energy markets are divided into wholesale and retail markets, in which the key elements are generation, transmission, distribution, and consumers. In the smart grid transactive systems use-case, blockchain could serve as a common platform for the prosumers (energy consumers and producers), energy utilities, auditors, and others. Through a blockchain platform, the consumers could have the ability to define contractual requirements through their smart contracts. For example, consumers can choose to buy energy only from renewable sources such as solar and wind, they can choose to buy from the cheapest producer, or they can choose to buy based on power quality. Through a blockchain platform, the consumers, producers, and prosumers can participate in energy markets (e.g., bilateral markets, double-auction markets, vickrey auction markets, etc.). Beyond energy transactions, blockchain technology can also potentially improve frequency response and regulation markets, applications with reactive power support, and more. In addition, the regulation compliance auditors can join the blockchain network as passive nodes with visibility on all transactions and without the ability to participate in the market. For the purpose of this experiment, an evaluation using BAF is performed for a transactive energy use case. States of the controls were chosen through a combination of subjective and objective decisions. Note that the test conducted does not include prosumer-style transactions. It is assumed that the market design aligns with the current energy market design, which does not have consumer-to-consumer transactions. Instead, all transactions are through the utilities. Therefore, some states of the controls may change significantly if prosumers and multi-utility participation is considered in the loop.

An example assessment output is shown below, and the output of the BAF is shown in FIG. 9. The solution syntax below is as follows: Core-<domain>-<subdomain>-ControlNumber=state. Example assessment output follows:

core-dp-an-1=4,core-dp-an-2=4,core-dp-da-1=4,core-dp-da-2=1,core-dp-da-3=1,core-dp-da-4=4,core-dp-da-5=1,core-dp-rw-1=4,core-dp-rw-2=3,core-dp-rw-3=1, core-dp-rw-4=1,core-dp-rw-5=2,core-dp-rwc-1=2, core-dp-rwc-2=3,core-dp-rwc-3=3,core-dp-rwc-4=4, core-dp-rwc-5=4,core-pe-ea-1=4,core-pe-ea-2=3,core-pe-ea-3=2,core-pe-ea-4=3,core-pe-ea-5=3,core-pe-md-1=4,core-pe-md-2=4,core-pe-md-3=1,core-pe-md-4=3,core-pe-md-5=1,core-pe-sp-1=1,core-pe-sp-2=3, core-pe-sp-3=2,core-pe-sp-4=2,core-pe-sp-5=1,core-sc-ac-1=4,core-sc-ac-2=1,core-sc-ac-3=1,core-sc-ac-4=1,core-sc-gv-1=4,core-sc-gv-2=1,core-sc-gv-3=1, core-sc-sa-1=4,core-sc-sa-2=2,core-sc-sa-3=4,core-sc-sa-4=1,core-sc-sa-5=1,core-sc-sa-6=2,core-ta-cn-1=2, core-ta-cn-2=4,core-ta-cn-3=2,core-ta-cn-4=2,core-ta-cn-5=1,core-ta-cn-6=4,core-ta-cn-7=2,core-ta-cn-8=1, core-ta-mc-1=1,core-ta-mc-10=1,core-ta-mc-11=1, core-ta-mc-12=1,core-ta-mc-13=1,core-ta-mc-2=1, core-ta-mc-3=1,core-ta-mc-4=4,core-ta-mc-5=1,core-ta-mc-6=1,core-ta-mc-7=1,core-ta-mc-8=4,core-ta-mc-9=3,core-ta-sc-1=4,core-ta-sc-2=1,core-ta-sc-3=4, core-ta-tc-1=4,core-ta-tc-2=3,core-ta-tc-3=4,core-ta-tc-4=3,core-ta-tc-5=4,core-ta-tp-1=4,core-ta-tp-2=4, core-ta-tp-3=3,core-ta-tp-4=4,core-ta-tp-5=1,core-ta-tp-6=4,core-tp-ig-1=2,core-tp-ig-2=4,core-tp-ig-3=1, core-tp-vd-1=1,core-tp-vd-2=2,core-tp-vd-3=1,core-tp-vd-4=1,core-tp-vd-5=1,core-tp-vs-1=1,core-tp-vs-2=4,core-tp-vs-3=4,core-tp-vs-4=4,type=core, date=1537758710622

As shown in FIG. 9, a BAF recommends blockchain for a transactive energy/energy markets application. Specifically, the BAF tool recommends a permissioned/private blockchain with a proof-of-authority consensus. There has been some research conducted that uses public blockchains, such as Ethereum, to demonstrate energy market systems. However, those demonstrations do not address some of the fundamental energy market requirements (discussed below). Therefore, Ethereum-based (public, PoW, permissionlesss) energy market designs may not be ideal for real-world transactive energy applications. To provide evidence for that inference, a few of the parameters needed to design an efficient energy market that can run various market mechanisms are as follows:

Security, Safety, and Privacy: Ensure that the consumers, producers, and prosumers are trading on a tamperproof platform with role-based access controls in place and as needed. The participating nodes are required to be validated and their identity protected. In addition, the transaction anonymity should be ensured to avoid malicious actors from learning bidding patterns and using that information for their advantage. Therefore, to maintain the security, safety, and privacy factors, permissioned/private blockchains are ideal.

Timing: There are various types of markets, such as real-time, day ahead, frequency regulation, and reactive power support. In order to successfully implement any of these markets, the platform should strictly comply to the timing requirements. For example, in a realtime-5 min-ahead market, each market cycle closes in five minutes. Therefore, all the steps from the bidding to releasing the cleared prices should be completed within five minutes. In such cases, energy intensive time-consuming proof of work consensus may not be the most practical consensus to use.

Scalability: A blockchain-based market system is desireably capable of hosting a large number of distributed energy resources (DERs) in order for blockchain to be used in real-world energy market applications.

Controllability, accountability, and visibility: The authority nodes such as the associated entity that runs the market, distribution system operator (DSO), and the primary utility should have control on the consumer, producer, and prosumer nodes that are allowed to participate in the market. Prior to joining the blockchain-based market platform, the participating nodes are validated by checking for compliance against pre-defined requirements. Therefore, the authority nodes should have controllability, total visibility, and a means to hold the participants accountable to their bids.

Based on the above factors, and from a comparative analysis across various blockchains, it is evident that permissioned/private blockchains with fast consensus (such as PoA, PBFT, etc.) are realistic blockchains to use in the energy market applications. Therefore, the final output of BAF for energy markets and smart grid transactive applications align with the fundamental requirements of energy market processes. Note that the analysis is performed using the base methodology and not using a criticality-based method. In other examples, the BAF may present the analysis and results from both methods and compare them in order to evaluate the level of accuracy.

Internet-of-things (IoT) supply chain: Blockchain technology has several benefits that could improve supply chain cyber risk management. Some benefits of the use of blockchain technology in supply chain management include the following: 1) Increased transparency and auditability of the system throughout the manufacturing, shipping, deployment, maintenance, and retirement life cycle. The chain of custody and monitoring of field devices can be provisioned and tracked in the blockchain through their entire life cycle. 2) The expedition and enhancement of inter-vendor cooperative system development through increased visibility and accessibility of supply chain data. 3) Improved security of the supply chain process through increased trustworthiness and integrity of data and elimination of the need for intermediary trust mechanisms and brokers. The need for some third-party IoT vendors might be eliminated or reduced as blockchain enables more trustworthy peer-to-peer transactions that are less susceptible to manipulation and compromise. 4) Principle component traceability throughout the system lifecycle to incorporate efficient systems engineering processes. 5) Improved audibility and monitoring of critical cyber assets that facilitates compliance and improves the security of devices.

Based on an example test set of supply chain management requirements, the results of an evaluation that is performed using BAF are shown in FIG. 10 as an assessment output. According to BAF, permissioned/private proof-of-authority blockchain may be ideal for supply chain management. Note that, according to BAF, proof-of-work consensus may also be sufficient. This result is acceptable since supply chain management does not have high performance requirements. As long as the participating nodes and the consensus nodes are the same (an ideal scenario for a permissioned/private blockchain type), PoA or PoW blockchains may be used for the supply chain security and management use-case. The BAF output (having the same syntax as described above for the Smart Grid Transactive Systems use-case) follows:

core-dp-an-1=2,core-dp-an-2=2,core-dp-da-1=2,core-dp-da-2=1,core-dp-da-3=1,core-dp-da-4=4,core-dp-da-5=1,core-dp-rw-1=4,core-dp-rw-2=4,core-dp-rw-3=1,core-dp-rw-4=1,core-dp-rw-5=3,core-dp-rwc-1=4,core-dp-rwc-2=3,core-dp-rwc-3=4,core-dp-rwc-4=3,core-dp-rwc-5=2,core-pe-ea-1=4,core-pe-ea-2=3,core-pe-ea-3=2,core-pe-ea-4=2,core-pe-ea-5=4,core-pe-md-1=1,core-pe-md-2=1,core-pe-md-3=1,core-pe-md-4=4,core-pe-md-5=1,core-pe-sp-1=4,core-pe-sp-2=4,core-pe-sp-3=4,core-pe-sp-4=1,core-pe-sp-5=2,core-sc-ac-1=4,core-sc-ac-2=1,core-sc-ac-3=1,core-sc-ac-4=1,core-sc-gv-1=4,core-sc-gv-2=3,core-sc-gv-3=1,core-sc-sa-1=3,core-sc-sa-2=4,core-sc-sa-3=4,core-sc-sa-4=2,core-sc-sa-5=1,core-sc-sa-6=4,core-ta-cn-1=1,core-ta-cn-2=2,core-ta-cn-3=2,core-ta-cn-4=3,core-ta-cn-5=1,core-ta-cn-6=4,core-ta-cn-7=2,core-ta-cn-8=1,core-ta-mc-1=1,core-ta-mc-10=1,core-ta-mc-11=1,core-ta-mc-12=1,core-ta-mc-13=1,core-ta-mc-2=1,core-ta-mc-3=1,core-ta-mc-4=1,core-ta-mc-5=1,core-ta-mc-6=1,core-ta-mc-7=1,core-ta-mc-8=3,core-ta-mc-9=3,core-ta-sc-1=3,core-ta-sc-2=2,core-ta-sc-3=4,core-ta-tc-1=3,core-ta-tc-2=4,core-ta-tc-3=3,core-ta-tc-4=4,core-ta-tc-5=1,core-ta-tp-1=4,core-ta-tp-2=1,core-ta-tp-3=4,core-ta-tp-4=4,core-ta-tp-5=4,core-ta-tp-6=1,core-tp-ig-1=4,core-tp-ig-2=4,core-tp-ig-3=1,core-tp-vd-1=1,core-tp-vd-2=1,core-tp-vd-3=1,core-tp-vd-4=2,core-tp-vd-5=1,core-tp-vs-1=1,core-tp-vs-2=4,core-tp-vs-3=4,core-tp-vs-4=1,type=core,date=1547365159111

Blockchain technology has been gaining a tremendous reputation because of its potential to improve existing processes in a cybersecure fashion while ensuring absolute transparency. However, this technology is complex to comprehend, which makes it non-trivial to identify the appropriate blockchain technology for an application. This disclosure describes a BAF that is configured to evaluate an application and identify the type of blockchain, and the appropriate consensus mechanism required for an application. An evaluation of the efficacy of this framework is exemplified by using it against a use case focused on transactive systems. Although described below with respect to select examples of consensus mechanisms and evaluation criteria, it is to be understood that BAF may be expanded or adjusted to include emerging consensus mechanisms and/or different evaluation criteria without departing from the scope of this disclosure. For example, BAF may be expanded to include the following: 1) Fully incorporate other consensus mechanisms such as Practical Byzantine Fault Tolerance (PBFT), Proof of Elapsed Time (PoET), Proof of Capacity (PoC), etc. 2) Make BAF dynamic by grouping the controls in order to make the tool reactive to user responses. If the tool is reactive, it could potentially generate the questions sequentially based on the response to the question at hand. This could potentially minimize the number of user responses required to determine the end result. 3) Assign the CIL values to the controls and scale the existing weights of the controls using its CIL. Doing so will not only capture state-based weight, but will also capture the importance of a control. 4) Partition the existing permissionless/public vs permissioned/private class into two classes: permissionless vs. permissioned and public vs. private and define unique controls associated with those classes. 5) Generate blockchain vendor/brand recommendations (e.g., ETHEREUM, HYPERLEDGER FABRIC, etc.) based on results of the evaluation. In some examples, BAF ingests user input to recommend the qualities of a blockchain to match with the application requirements. Beyond that, it is the user's responsibility to adopt a blockchain vendor/brand that matches the BAF outputs. If the user cannot find the blockchain vendor/brand that fulfills the application requirements, the user can explore options such as developing their own blockchain or forking from an existing blockchain. However, in other examples, BAF may compare the outputs to existing blockchain providers and recommend a provider for the user.

Example Computing Environment

Figure 11:
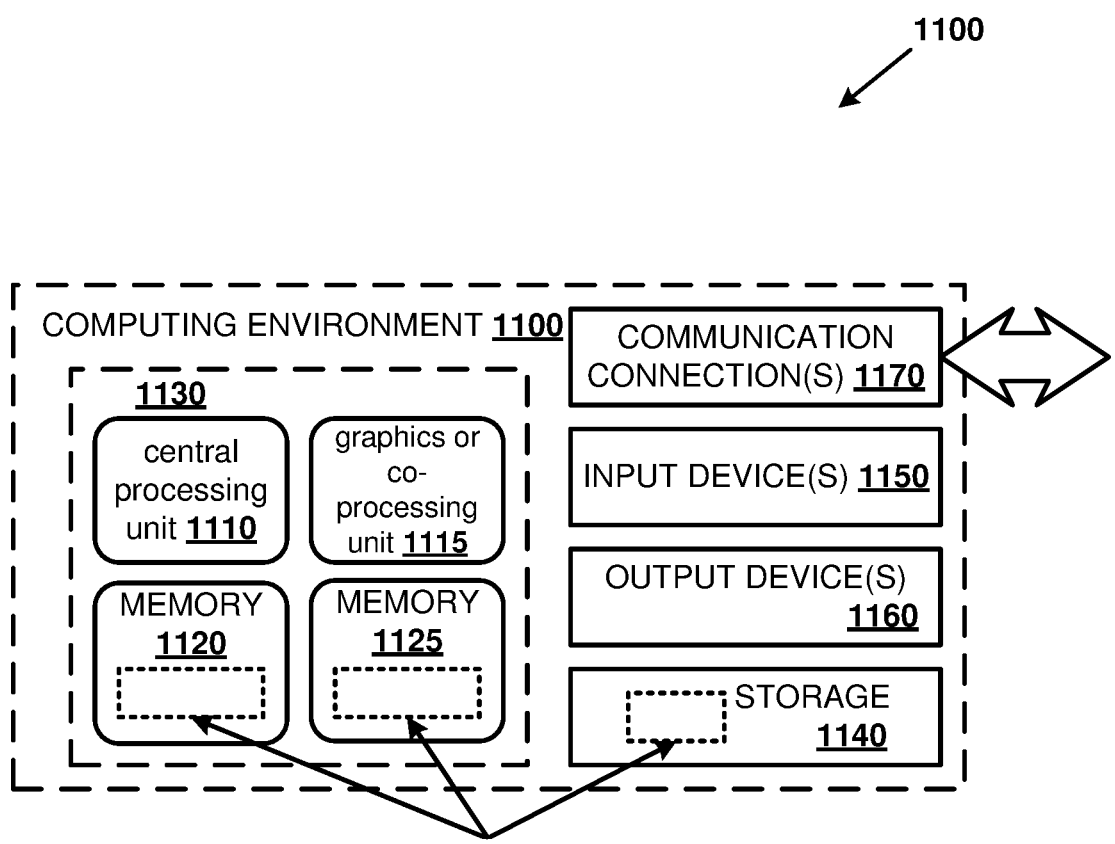
FIG. 11 illustrates a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein. As used herein, "computer-readable media" are any available media that can be accessed within the computing environment 1100. By way of example, and not limitation, with the computing environment 1100, computer-readable media include memory 1120 and/or storage 1140. As should be readily understood, the term computer-readable storage media includes the media for data storage such as memory 1120 and storage 1140, and not transmission media such as modulated data signals.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term "computer-readable storage media" does not include intangible communication connections, such as signals and carrier waves. Any of the computer-executable instructions for implementing the disclosed techniques as well as any data created and used during implementation of the disclosed examples can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood to one of ordinary skill in the relevant art having the benefit of the present disclosure that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood to one of ordinary skill in the relevant art having the benefit of the present disclosure that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Additional examples and further details on disclosed technologies are described in the included manuscripts, which are incorporated as if set forth fully herein for all purposes.

The disclosed methods, apparatus, and systems should not be construed as limiting in any way. Instead, the present disclosure is directed toward all novel features and aspects of the various disclosed examples, alone and in various combinations and subcombinations with one another. The disclosed methods, apparatus, and systems are not limited to any specific aspect or feature or combination thereof, nor do the disclosed examples require that any one or more specific advantages be present or problems be solved.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

What is claimed is:

1. A system comprising:
    memory;
    a processor coupled to a network interface; and
    at least one computer-readable storage medium storing computer-readable instructions,
    which when executed by the processor, cause the processor to perform distributed ledger operations, the operations comprising:
        storing, in a database, a plurality of records of data transmitted between an energy delivery system asset and a utility historian for an energy delivery system, the plurality of records being cryptographically-signed;
        performing an asset validation for the energy delivery system asset, the asset validation comprising validating the energy delivery system asset and generating a unique identifier based on the validation of the energy delivery system asset;
        storing, in a distributed ledger, a respective hash value corresponding to each record of the plurality of records stored in the database;
        verifying a selected record stored in the database by recomputing a hash value corresponding to the selected record to generate a recomputed hash value for the selected record and comparing the recomputed hash value to the respective hash value stored in the distributed ledger in correspondence with the selected record; and
        configuring at least one aspect of the energy delivery system based on the verifying the selected record.

2. The system of claim 1, wherein at least one of the plurality of cryptographically-signed records includes the unique identifier.

3. The system of claim 1, wherein the unique identifier is derived from a combination of at least two of: a serial number associated with the energy delivery system asset, a media access control (MAC) address associated with the energy delivery system asset, or a checksum or bar code associated with the energy delivery system asset.

4. The system of claim 1, wherein the configuration occurs responsive to the comparing indicating that the recomputed hash value and the respective hash value are the same.

5. The system of claim 1, wherein the computer-readable instructions are first instructions, and the at least one computer-readable storage medium further stores second instructions, which when executed by the processor, cause the processor to output an indication of non-matching hash values responsive to the comparison of the recomputed hash value to the respective hash value stored in the distributed ledger in correspondence with the selected record yielding a non-matching result.

6. The system of claim 5, wherein the at least one computer-readable storage medium further stores third instructions, which when executed by the processor, cause the processor to store the indicator in a log.

7. The system of claim 1, wherein at least one of the database and the distributed ledger is connected in-line with the utility historian and the plurality of records of data flow through the at least one of the database and the distributed ledger.

8. The system of claim 1, wherein at least one of the database and the distributed ledger is connected in parallel with the utility historian.

9. A computer-implemented method comprising:
    storing, in a distributed ledger, a respective hash value representing each of a plurality of cryptographically-signed data records, the plurality of cryptographically-signed data records including a record of data transmitted between an energy delivery system asset and a utility historian for the energy delivery system or between the energy delivery system asset and another hardware system, wherein the plurality of cryptographically-signed data records further includes a record of a unique identifier generated for the energy delivery system asset during an asset registration, the unique identifier being generated based on a validation of asset information for the energy delivery system asset;

verifying the record of data by recomputing a hash value for the record of data to generate a recomputed hash value and comparing the recomputed hash value to the respective hash value representing the record of data as stored in the distributed ledger; and selectively configuring at least one aspect of the energy delivery system using the record of data based on a result of the verifying the record of data.

10. The computer-implemented method of claim 9, further comprising verifying an identity of an energy delivery system asset by comparing a unique identifier for the energy delivery system asset with a stored unique identifier in the distributed ledger.

11. The computer-implemented method of claim 9, wherein the plurality of cryptographically-signed data records are secured in an on-chain, data-at-rest configuration.

12. The computer-implemented method of claim 9, wherein the plurality of cryptographically-signed data records are secured in an off-chain, data-at-rest configuration.

13. The computer-implemented method of claim 9, wherein the plurality of cryptographically-signed data records are secured in an on-chain, data-in-transit configuration.

14. The computer-implemented method of claim 9, wherein the plurality of cryptographically-signed data records are secured in an off-chain, data-in-transit configuration.

15. One or more computer-readable storage media storing computer-readable instructions that upon execution by a computer, cause the computer to perform a method, the instructions comprising:
   instructions that cause the computer to receive asset-specific data identifying a remote asset;
   instructions that cause the computer to perform an asset validation for the energy delivery system asset, the asset validation comprising validating an energy delivery system asset and generating a unique identifier based on the validation of the energy delivery system asset using the asset-specific data;
   instructions that cause the computer to record at least one of a record of the unique identifier, an associated hash of the unique identifier, or the asset-specific data;
   instructions that cause the computer to combine data for a transaction to generate the record into a block of a blockchain;
   instructions that cause the computer to product approval for the block using a consensus mechanism; and
   instructions that cause the computer to append the approved block to the blockchain.

16. The one or more computer-readable storage media of claim 15, wherein the unique identifier is generated by addressing the asset-specific data to a registration smart contract that is configured to process the asset-specific data and output the unique identifier responsive to determining that the asset-specific data is valid.

17. The one or more computer-readable storage media of claim 16, wherein the determination that the asset-specific data is valid is based on output of a group of consensus nodes.

18. The one or more computer-readable storage media of claim 15, wherein the record is recorded in a distributed ledger.

* * * * *